(12) United States Patent
Sarwar et al.

(10) Patent No.: US 11,555,753 B2
(45) Date of Patent: Jan. 17, 2023

(54) PROXIMITY AND THREE-AXIS FORCE SENSOR

(71) Applicant: Honda Motor Co., Ltd., Tokyo (JP)

(72) Inventors: Mirza Saquib Sarwar, San Jose, CA (US); Katsu Yamane, Mountain View, CA (US); Ryusuke Ishizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/385,524

(22) Filed: Jul. 26, 2021

(65) Prior Publication Data

US 2022/0221356 A1 Jul. 14, 2022

Related U.S. Application Data

(63) Continuation-in-part of application No. 17/218,800, filed on Mar. 31, 2021, and a continuation-in-part of application No. 17/174,226, filed on Feb. 11, 2021.

(60) Provisional application No. 63/153,596, filed on Feb. 25, 2021, provisional application No. 63/136,428, filed on Jan. 12, 2021.

(51) Int. Cl.
*G01L 5/165* (2020.01)
*G01D 5/241* (2006.01)
*G01L 1/14* (2006.01)

(52) U.S. Cl.
CPC ............ *G01L 5/165* (2013.01); *G01D 5/2417* (2013.01); *G01L 1/14* (2013.01)

(58) Field of Classification Search
CPC .... G01D 5/241; G01D 5/2412; G01D 5/2417; G01L 1/14; G01L 1/142; G01L 1/146; G01L 5/165; G01L 5/226; G01L 5/228; G06F 3/0445; G06F 3/0446; G06F 3/0447; G06F 3/0448; G06F 2203/04102
See application file for complete search history.

(56) References Cited

U.S. PATENT DOCUMENTS 10,831,319 B2 11/2020 Madden et al.
2018/0073942 A1* 3/2018 Wu .......................... G01L 1/142
(Continued)

OTHER PUBLICATIONS

K. Altun and K. E. MacLean, "Recognizing affect in human touch of a robot," Pattern Recognition Letters, vol. 66, pp. 31-40, 2015.
(Continued)

*Primary Examiner* — Steven L Yeninas
(74) *Attorney, Agent, or Firm* — Rankin, Hill & Clark LLP

(57) ABSTRACT

A proximity and three-axis force sensor based sensor may include a first taxel including a first electrode formed within a top layer configured in a serpentine pattern, a second electrode formed within a bottom layer, and a dielectric layer positioned between the top layer and the bottom layer and a second taxel including a first electrode formed within the top layer and having a first surface area, a second electrode formed within the bottom layer and having a second surface area, and a ground electrode formed within the top layer above the first electrode of the second taxel having a surface area greater than the first surface area of the first electrode of the second taxel. The second surface area may be different than the first surface area. A first edge of the first electrode may be vertically aligned with a first edge of the second electrode.

20 Claims, 22 Drawing Sheets

(56) References Cited

U.S. PATENT DOCUMENTS

| | | | | |
|---|---|---|---|---|
| 2018/0238716 | A1* | 8/2018 | Madden | G01L 1/146 |
| 2018/0246594 | A1* | 8/2018 | Madden | G06F 3/0447 |
| 2020/0064948 | A1* | 2/2020 | Chang | G06F 3/0448 |
| 2020/0125817 | A1* | 4/2020 | Kim | G06V 10/993 |
| 2021/0318768 | A1* | 10/2021 | Fang | G06F 3/0445 |
| 2022/0087008 | A1* | 3/2022 | Sano | G06F 3/044 |
| 2022/0214232 | A1* | 7/2022 | Ishizaki | G01L 1/142 |
| 2022/0221349 | A1* | 7/2022 | Ishizaki | G01L 1/142 |
| 2022/0228937 | A1* | 7/2022 | Ishizaki | G01L 5/165 |

OTHER PUBLICATIONS

B. D. Argall and A. G. Billard, "A survey of tactile human-robot interactions," Robotics and autonomous systems, vol. 58, No. 10, pp. 1159-1176, 2010.
T. Balli Altuglu and K. Altun, "Recognizing touch gestures for social human-robot interaction," in Proceedings of the 2015 ACM on International Conference on Multimodal Interaction, 2015, pp. 407-413.
M. D. Cooney, S. Nishio, and H. Ishiguro, "Recognizing affection for a touch-based interaction with a humanoid robot," in 2012 IEEE/RSJ International Conference on Intelligent Robots and Systems. IEEE, 2012, pp. 1420-1427.
M. Cooney, S. Nishio, and H. Ishiguro, "Affectionate interaction with a small humanoid robot capable of recognizing social touch behavior," ACM Trans. Interact. Intell. Syst., vol. 4, No. 4, Dec. 2014. [Online]. Available: https://doi.org/10.1145/2685395.
M. D. Dickey, "Stretchable and soft electronics using liquid metals," Advanced Materials, vol. 29, No. 27, p. 1606425, 2017.
F. A. Gers, N. N. Schraudolph, and J. Schmidhuber, "Learning precise timing with lstm recurrent networks," Journal of machine learning research, vol. 3, No. Aug, pp. 115-143, 2002.
D. Goeger, M. Blankertz, and H. Woern, "A tactile proximity sensor," in Sensors, 2010 IEEE. IEEE, 2010, pp. 589-594.
M. L. Hammock, A. Chortos, B. C.-K. Tee, J. B.-H. Tok, and Z. Bao, "25th anniversary article: The evolution of electronic skin (e-skin): a brief history, design considerations, and recent progress," Adv. Mater., vol. 25, No. 42, pp. 5997-6038, Nov. 2013, doi: 10.1002/adma.201302240.
M. Heerink, B. Kröse, B. Wielinga, and V. Evers, "Enjoyment intention to use and actual use of a conversational robot by elderly people," in Proceedings of the 3rd ACM/IEEE international conference on Human robot interaction, 2008, pp. 113-120.
M. J. Hertenstein, R. Holmes, M. McCullough, and D. Keltner, "The communication of emotion via touch." Emotion, vol. 9, No. 4, p. 566, 2009.
S. Hochreiter and J. Schmidhuber, "Long short-term memory," Neural computation, vol. 9, No. 8, pp. 1735-1780, 1997.
W. Hu, X. Niu, R. Zhao, and Q. Pei, "Elastomeric transparent capacitive sensors based on an interpenetrating composite of silver nanowires and polyurethane," Applied Physics Letters, vol. 102, No. 8, p. 38, 2013.
K.-H. Huang, F. Tan, T.-D. Wang, and Y.-J. Yang, "A highly sensitive pressure-sensing array for blood pressure estimation assisted by machine-learning techniques," Sensors, vol. 19, No. 4, p. 848, 2019.
D. Hughes, A. Krauthammer, and N. Correll, "Recognizing social touch gestures using recurrent and convolutional neural networks," in 2017 IEEE International Conference on Robotics and Automation (ICRA). IEEE, 2017, pp. 2315-2321.
W. Jillek and W. K. C. Yung, "Embedded components in printed circuit boards: A processing technology review," Int. J. Adv. Manuf. Technol., vol. 25, No. 3-4, pp. 350-360, 2005, doi: 10.1007/s00170-003-1872-y.
M. M. Jung, M. Poel, R. Poppe, and D. K. Heylen, "Automatic recognition of touch gestures in the corpus of social touch," Journal on multimodal user interfaces, vol. 11, No. 1, pp. 81-96, 2017.
M. Kanamori, M. Suzuki, H. Oshiro, M. Tanaka, T. Inoguchi, H. Takasugi, Y. Saito, and T. Yokoyama, "Pilot study on improvement of quality of life among elderly using a pet-type robot," in Proceedings 2003 IEEE International Symposium on Computational Intelligence in Robotics and Automation. Computational Intelligence in Robotics and Automation for the New Millennium (Cat. No. 03EX694), vol. 1. IEEE, 2003, pp. 107-112.
K. S. Karimov, M. Saleem, Z. M. Karieva, A. Khan, T. A. Qasuria, and A. Mateen, "A carbon nanotube-based pressure sensor," Phys Scr., vol. 83, No. 6, p. 065703, Jun. 2011, doi: 10 1088/0031-8949/83/06/065703
J. Kim, A. Alspach, I. Leite, and K. Yamane, "Study of children's hugging for interactive robot design," in 2016 25th IEEE International Symposium on Robot and Human Interactive Communication (ROMAN). IEEE, 2016, pp. 557-561.
A. E. Kubba, A. Hasson, A. I. Kubba, and G. Hall, "A micro-capacitive pressure sensor design and modelling," Journal of Sensors and Sensor Systems, vol. 5, No. 1, pp. 95-112, 2016.
H.-K. Lee, S.-I. Chang, and E. Yoon, "Dual-mode capacitive proximity sensor for robot application: Implementation of tactile and proximity sensing capability on a single polymer platform using shared electrodes," IEEE sensors journal, vol. 9, No. 12, pp. 1748-1755, 2009.
S. H. Lee, J. H. Lee, C. Park, and M. K. Kwak, "Roll-type photolithography for continuous fabrication of narrow bus wires," Journal of Micromechanics and Microengineering, vol. 26, No. 11, p. 115008, 2016.
B. Li, A. K. Fontecchio, and Y. Visell, "Mutual capacitance of liquid conductors in deformable tactile sensing arrays," Appl. Phys. Lett., vol. 108, No. 1, p. 013502, Jan. 2016, doi: 10.1063/1.4939620.
S. Ma et al., "Fabrication of Novel Transparent Touch Sensing Device via Drop-on-Demand Inkjet Printing Technique," ACS Appl. Mater. Interfaces, vol. 7, No. 39, pp. 21628-21633, Oct. 2015, doi: 10.1021/acsami.5b04717.
S. C. B. Mannsfeld et al., "Highly sensitive flexible pressure sensors with microstructured rubber dielectric layers," Nat. Mater., vol. 9, No. 10, pp. 859-864, Oct. 2010, doi: 10.1038/nmat2834.
A. Moin et al., "A wearable biosensing system with in-sensor adaptive machine learning for hand gesture recognition," Nat. Electron., doi: 10.1038/s41928-020-00510-8.
S. Park, H. Kim, M. Vosgueritchian, S. Cheon, H. Kim, J. H. Koo, T. R. Kim, S. Lee, G. Schwartz, H. Chang et al., "Stretchable energy-harvesting tactile electronic skin capable of differentiating multiple mechanical stimuli modes," Advanced Materials, vol. 26, No. 43, pp. 7324-7332, 2014.
J.-H. Park, J.-H. Seo, Y.-H. Nho, and D.-S. Kwon, "Touch gesture recognition system based on 1d convolutional neural network with two touch sensor orientation settings," in 2019 16th International Conference on Ubiquitous Robots (UR). IEEE, 2019, pp. 65-70.
H. Shamkhalichenar, C. J. Bueche, and J. Choi, "Printed Circuit Board ( PCB ) Technology for Electrochemical Sensors and Sensing Platforms," 2020.
S. Sharma, A. Chhetry, S. Ko, and J. Y. Park, "Polymer-Mxene Composite Nanofiber Mat for Wearable Health Monitoring," No. 20 ml, pp. 810-813, 2020.
X. Shi, Z. Chen, H. Wang, D.-Y. Yeung, W.-K. Wong, and W.-c. Woo, "Convolutional lstm network: A machine learning approach for precipitation nowcasting," arXiv preprint arXiv:1506.04214, 2015.
D. Silvera-Tawil, D. Rye, and M. Velonaki, "Arlilicial skin and tactile sensing for socially interactive robots: A review," Rob. Auton Syst., vol. 63, pp. 230-243, Jan. 2015, doi: 10.1016/J.ROBOT.2014.09.008.
T. Tajika, T. Miyashita, H. Ishiguro, and N. Higata, "Automatic categorization of haptic interactions—what are the typical haptic interactions between a human and a robot?" in 2006 6th IEEE-RAS International Conference on Humanoid Robots. IEEE, 2006, pp. 490-496.
C. B. Thoresen and U. Hanke, "Numerical simulation of mutual capacitance touch screens for ungrounded objects," IEEE Sensors Journal, vol. 17, No. 16, pp. 5143-5152, 2017.
M. Valero et al., "Interfacial pressure and shear sensor system for fingertip contact applications.," Healthc. Technol. Lett., vol. 3, No. 4, pp. 280-283, Dec. 2016, doi: 10.1049/htl.2016.0062.

(56) References Cited

OTHER PUBLICATIONS

Y. Vladimirsky, "10. lithography," in Vacuum Ultraviolet Spectroscopy II, ser. Experimental Methods in the Physical Sciences, J. Samson and D. Ederer, Eds. Academic Press, 1998, vol. 32, pp. 205-223. [Online]. Available: https://www.sciencedirect.com/science/article/pii/S0076695X08602835.
G. Walker, "A review of technologies for sensing contact location on the surface of a display," J. Soc. Inf. Disp., vol. 20, No. 8, pp. 413-440, Aug. 2012, doi: 10.1002/jsid.100.
X. Wang, T. Li, J. Adams, and J. Yang, "Transparent, stretchable, carbon-nanotube-inlaid conductors enabled by standard replication technology for capacitive pressure, strain and touch sensors," J. Mater. Chem. A, vol. 1, No. 11, p. 3580, 2013, doi: 10.1039/c3ta00079f.
G. Zhu, L. Zhang, P. Shen, J. Song, S. A. A. Shah, and M. Bennamoun, "Continuous gesture segmentation and recognition using 3dcnn and convolutional lstm," IEEE Transactions on Multimedia, vol. 21, No. 4, pp. 1011-1021, 2018.
B. Zhuo, S. Chen, M. Zhao, and X. Guo, "High Sensitivity Flexible Capacitive Pressure Sensor Using Polydimethylsiloxane Elastomer Dielectric Layer Micro-Structured by 3-D Printed Mold," IEEE J. Electron Devices Soc., vol. 5, No. 3, pp. 219-223, May 2017, doi: 10.1109/JEDS.2017.2683558.
Office Action of U.S. Appl. No. 17/218,800 dated Sep. 21, 2022, 37 pages.

\* cited by examiner

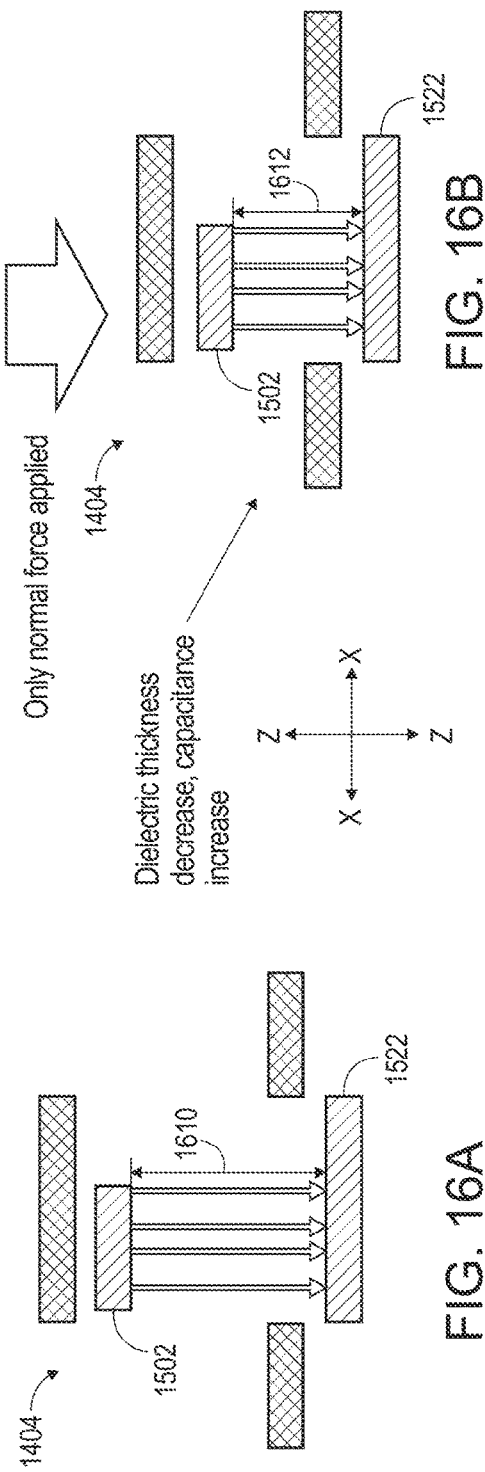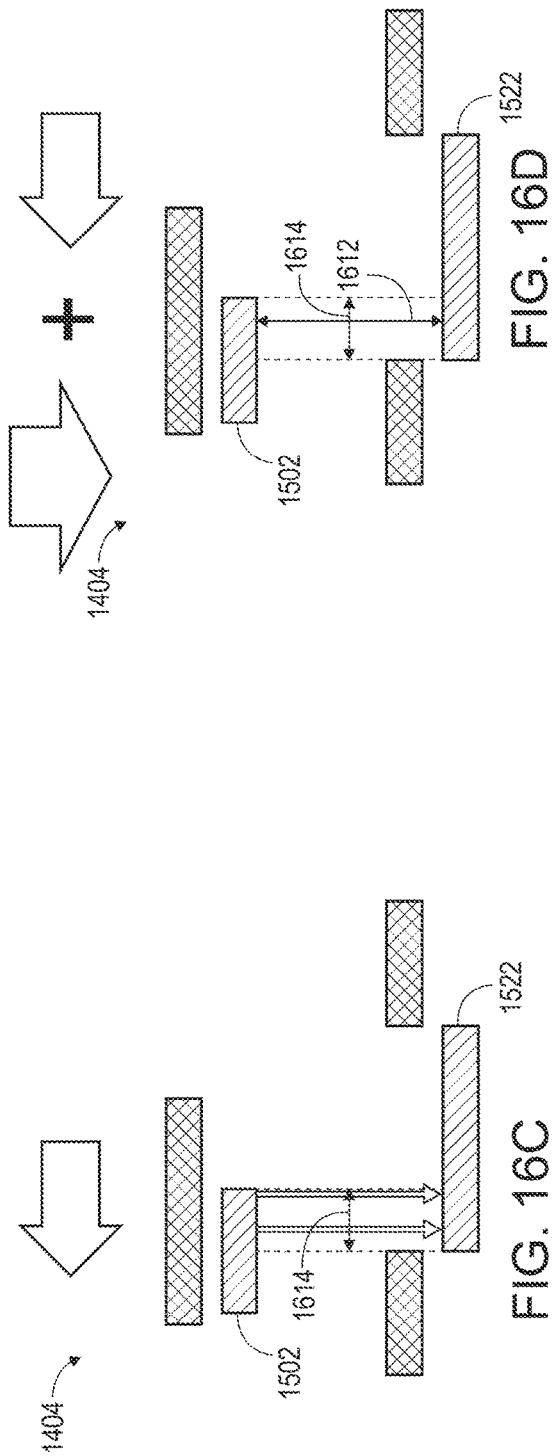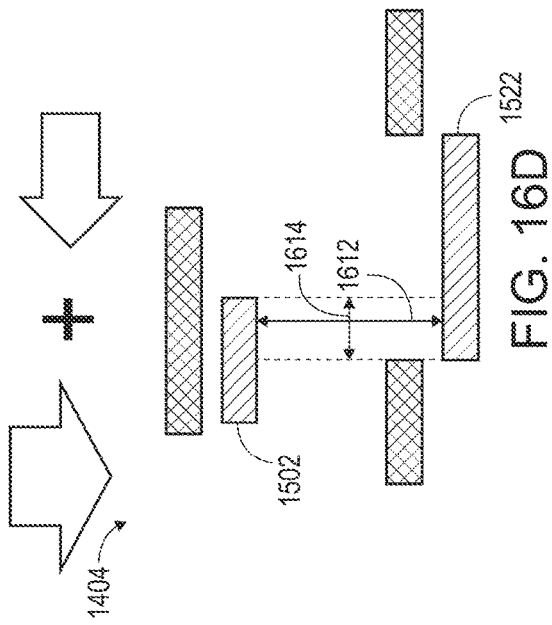

PROXIMITY AND THREE-AXIS FORCE SENSOR

CROSS-REFERENCE TO RELATED APPLICATIONS

This application is a continuation-in-part (CIP) of U.S. Non-Provisional application Ser. No. 17/218,800 filed on Mar. 31, 2021 entitled "MUTUAL AND OVERLAP CAPACITANCE BASED SENSOR", which is a CIP that claims priority to U.S. Provisional Application Ser. No. 63/153,596 filed on Feb. 25, 2021 entitled "SENSOR FOR PROXIMITY, LIGHT TOUCH, AND PRESSURE-BASED GESTURE RECOGNITION" and claims priority to U.S. Non-Provisional application Ser. No. 17/174,226 filed on Feb. 11, 2021 entitled "SYSTEM AND METHOD FOR FABRICATING SOFT SENSORS THAT CONFORM TO ARBITRARY SMOOTH GEOMETRIES", which claims priority to U.S. Provisional Application Ser. No. 63/136,428 filed on Jan. 12, 2021 entitled "SYSTEM AND METHOD FOR FABRICATING SOFT SENSORS THAT CONFORM TO ARBITRARY SMOOTH GEOMETRIES", all of which are expressly incorporated herein by reference.

BACKGROUND

The need for soft tactile sensors that conform to arbitrary smooth geometries has been a bottleneck for developing robot hands with dexterous manipulating capabilities. The field requires the sensor to be soft, skin-like, and to conform to the shape of a fingertip and/or a palm. Although, there has been significant development in the field of soft sensors, however, most of them are all in academia. In actual commercial applications several other requirements need to be met especially in the readout electronics segment. For example, adhering soft sensors for robotic purposes may often be a challenge and delamination is often an issue.

Additionally, many pressure sensor arrays have difficulty detecting light contacts because signal amplitudes are very small, while highly sensitive force sensors saturate at high-force interactions.

BRIEF DESCRIPTION

According to one aspect, a system for fabricating soft sensors that conform to arbitrary smooth geometries that includes a top stretchable layer that includes a set of electrodes of soft sensors that are made of an elastic material. The system also includes a bottom flexible layer that is composed of a thin sheet of suitable metal that is patterned using photolithography. The bottom flexible layer is configured to be in conformity with the arbitrary smooth geometries. The top stretchable layer is bonded to the bottom flexible layer to form a sensor substrate. The sensor substrate is configured as a stretchable adhesive film which enables robust adhesion to the arbitrary smooth geometries.

According to another aspect, a method for fabricating soft sensors that conform to arbitrary smooth geometries that includes fabricating a top stretchable layer that includes a set of electrodes of soft sensors that are made of an elastic material. The method also includes fabricating a bottom flexible layer that is composed of a thin sheet of suitable metal that is patterned using photolithography. The bottom flexible layer is configured to be in conformity with the arbitrary smooth geometries. The method further includes bonding the top stretchable layer to the bottom flexible layer to form a sensor substrate. The sensor substrate is configured as a stretchable adhesive film which enables robust adhesion to the arbitrary smooth geometries.

According to yet another aspect, a system for fabricating soft sensors that conform to arbitrary smooth geometries that includes a sensor substrate that is configured to as a stretchable adhesive film which enables robust adhesion to a robotic device that includes a top stretchable layer that includes a set of electrodes of soft sensors that are made of an elastic material. The sensor substrate also includes a bottom flexible layer that is composed of copper films that are patterned using photolithography.

A mutual and overlap capacitance based sensor may include a top stretchable layer including a first electrode configured in a serpentine pattern, a bottom layer including a second electrode, and a dielectric layer positioned between the first electrode and the second electrode.

The second electrode may have a line shape which runs perpendicular to a wavelength direction of the first electrode and parallel to an amplitude direction of the of the first electrode. The first electrode may be arranged such that a first portion of the first electrode overlaps the second electrode and the first portion of the first electrode may include a contour. The first electrode may be arranged such that a first portion of the first electrode overlaps the second electrode and a portion of the second electrode may include an exposed area not covered by the first electrode. The first portion of the first electrode may include a contour and a portion of the second electrode may include an exposed area not covered by the first electrode.

A first portion of the second electrode may include an exposed area not covered by the first electrode and a second portion of the second electrode may include a covered area covered by the first electrode. The first portion of the second electrode may be associated with a first taxel of the mutual and overlap capacitance based sensor and the second portion of the second electrode may be associated with a second taxel of the mutual and overlap capacitance based sensor. A processor may determine a sensing mode based on a capacitance reading from the first taxel being within a first range, a second range, or between the first range and the second range and a reading from the second taxel. The first taxel may neighbor the second taxel. The sensing mode may be a mutual capacitance mode or an overlap capacitance mode.

A mutual and overlap capacitance based sensor may include a top stretchable layer including a first electrode configured in a serpentine pattern, a bottom layer including a second electrode, and a dielectric layer positioned between the first electrode and the second electrode. The second electrode may have a line shape which runs perpendicular to a wavelength direction of the first electrode and parallel to an amplitude direction of the of the first electrode.

The first electrode may be arranged such that a first portion of the first electrode overlaps the second electrode and the first portion of the first electrode may include a contour. The first electrode may be arranged such that a first portion of the first electrode overlaps the second electrode and a portion of the second electrode may include an exposed area not covered by the first electrode. The first portion of the first electrode may include a contour and a portion of the second electrode may include an exposed area not covered by the first electrode. A first portion of the second electrode may include an exposed area not covered by the first electrode and a second portion of the second electrode may include a covered area covered by the first electrode. The first portion of the second electrode may be associated with a first taxel of the mutual and overlap capacitance based sensor and the second portion of the second electrode may be associated with a second taxel of the mutual and overlap capacitance based sensor.

A system for mutual and overlap capacitance sensing may include a mutual and overlap capacitance based sensor including a top stretchable layer including a first electrode configured in a serpentine pattern, a bottom layer including a second electrode, and a dielectric layer positioned between the first electrode and the second electrode and a processor. The processor may determine a sensing mode for the mutual and overlap capacitance based sensor based on a capacitance reading from a first taxel of the mutual and overlap capacitance based sensor being within a first range, a second range, or between the first range and the second range and a reading from a second taxel of the mutual and overlap capacitance based sensor neighboring the first taxel.

The second electrode may have a line shape which runs perpendicular to a wavelength direction of the first electrode and parallel to an amplitude direction of the of the first electrode. The first electrode may be arranged such that a first portion of the first electrode overlaps the second electrode and the first portion of the first electrode may include a contour. The first electrode may be arranged such that a first portion of the first electrode overlaps the second electrode and a portion of the second electrode may include an exposed area not covered by the first electrode.

According to one aspect, a proximity and three-axis force sensor based sensor may include a first taxel and a second taxel. The first taxel may include a first electrode formed within a top layer and be configured in a serpentine pattern, a second electrode formed within a bottom layer, and a dielectric layer positioned between the top layer and the bottom layer. The second taxel may include a first electrode formed within the top layer and having a first surface area, a second electrode formed within the bottom layer and having a second surface area, and a ground electrode formed within the top layer above the first electrode of the second taxel and having a surface area greater than the first surface area of the first electrode of the second taxel and decoupling electric fields emitted by the first electrode of the second taxel. The second surface area of the second electrode of the second taxel may be different than the first surface area of the first electrode of the second taxel. A first edge of the first electrode of the second taxel may be vertically aligned with a first edge of the second electrode of the second taxel.

The second taxel may include a ground electrode formed within the bottom layer above the second electrode. The ground electrode of the bottom layer may not overlap the second electrode in a vertical direction. The second taxel may include a ground electrode formed within the bottom layer above the second electrode. The ground electrode of the bottom layer may include a void defined directly above the second electrode in the vertical direction. A second edge of the first electrode of the second taxel may not be vertically aligned with a second edge of the second electrode of the second taxel.

A dielectric thickness of the dielectric layer may decrease and a capacitance of the second taxel of the proximity and three-axis force sensor may increase when a normal force is applied to the top layer in a vertical direction. An overlap area between the first electrode of the second taxel and the second electrode of the second taxel may decrease and a capacitance of the second taxel of the proximity and three-axis force sensor may decrease when a lateral force is applied to the top layer in a lateral direction.

The proximity and three-axis force sensor based sensor may include a third taxel. The third taxel may include a first electrode formed within the top layer and having a first surface area, a second electrode formed within the bottom layer and having a second surface area, and a ground electrode formed within the top layer above the first electrode of the third taxel and having a surface area greater than the first surface area of the first electrode of the third taxel. The second surface area of the second electrode of the third taxel may be different than the first surface area of the first electrode of the third taxel. A first edge of the first electrode of the third taxel may not be vertically aligned with a first edge of the second electrode of the third taxel. A second edge of the first electrode of the third taxel may be vertically aligned with a second edge of the second electrode of the third taxel. The first edge of the first electrode of the second taxel may be opposed to the second edge of the first electrode of the third taxel. The first edge of the second electrode of the second taxel may be opposed to the second edge of the second electrode of the third taxel.

An overlap area between the first electrode of the second taxel and the second electrode of the second taxel may decrease and a capacitance of the second taxel of the proximity and three-axis force sensor may decrease when a lateral force is applied to the top layer in a lateral direction. An overlap area between the first electrode of third taxel and the second electrode of the third taxel may remain constant and a capacitance of the third taxel of the proximity and three-axis force sensor may remain constant when the lateral force is applied to the top layer in the lateral direction.

An overlap area between the first electrode of the second taxel and the second electrode of the second taxel may remain constant and a capacitance of the second taxel of the proximity and three-axis force sensor may remain constant when a lateral force is applied to the top layer in an opposite lateral direction. An overlap area between the first electrode of third taxel and the second electrode of the third taxel may decrease and a capacitance of the third taxel of the proximity and three-axis force sensor may decrease when the lateral force is applied to the top layer in the opposite lateral direction.

The second surface area of the second electrode of the second taxel may be greater than the first surface area of the first electrode of the second taxel.

A proximity and three-axis force sensor based sensor may include a first taxel and a second taxel. The first taxel may include a first electrode formed within a top layer and be configured in a serpentine pattern, a second electrode formed within a bottom layer, and a dielectric layer positioned between the top layer and the bottom layer. The second taxel may include a first electrode formed within the top layer and having a first surface area, a second electrode formed within the bottom layer and having a second surface area, and a ground electrode formed within the bottom layer above the second electrode. The ground electrode may not overlap the second electrode in a vertical direction. The second surface area of the second electrode of the second taxel may be different than the first surface area of the first electrode of the second taxel. A first edge of the first electrode of the second taxel may be vertically aligned with a first edge of the second electrode of the second taxel.

The second taxel may include a ground electrode formed within the top layer above the first electrode of the second taxel having a surface area greater than the first surface area of the first electrode of the second taxel. The ground electrode of the bottom layer may include a void defined directly above the second electrode in the vertical direction. A second edge of the first electrode of the second taxel may not be vertically aligned with a second edge of the second electrode of the second taxel.

A dielectric thickness of the dielectric layer may decrease and a capacitance of the second taxel of the proximity and three-axis force sensor may increase when a normal force is applied to the top layer in the vertical direction. An overlap area between the first electrode of the second taxel and the second electrode of the second taxel may decrease and a capacitance of the second taxel of the proximity and three-axis force sensor may decrease when a lateral force is applied to the top layer in a lateral direction.

The proximity and three-axis force sensor based sensor may include a third taxel. A third taxel may include a first electrode formed within the top layer and having a first surface area, a second electrode formed within the bottom layer and having a second surface area, and a ground electrode formed within the bottom layer above the first electrode of the third taxel. The ground electrode of the third taxel may not overlap the second electrode of the third taxel in a vertical direction.

The second surface area of the second electrode of the third taxel may be different than the first surface area of the first electrode of the third taxel. A first edge of the first electrode of the third taxel may not be vertically aligned with a first edge of the second electrode of the third taxel. A second edge of the first electrode of the third taxel may be vertically aligned with a second edge of the second electrode of the third taxel. The first edge of the first electrode of the second taxel may be opposed to the second edge of the first electrode of the third taxel. The first edge of the second electrode of the second taxel may be opposed to the second edge of the second electrode of the third taxel.

An overlap area between the first electrode of the second taxel and the second electrode of the second taxel may decrease and a capacitance of the second taxel of the proximity and three-axis force sensor may decrease when a lateral force is applied to the top layer in a lateral direction. An overlap area between the first electrode of third taxel and the second electrode of the third taxel may remain constant and a capacitance of the third taxel of the proximity and three-axis force sensor may remain constant when the lateral force is applied to the top layer in the lateral direction.

An overlap area between the first electrode of the second taxel and the second electrode of the second taxel may remain constant and a capacitance of the second taxel of the proximity and three-axis force sensor may remain constant when a lateral force is applied to the top layer in an opposite lateral direction. An overlap area between the first electrode of third taxel and the second electrode of the third taxel may decrease and a capacitance of the third taxel of the proximity and three-axis force sensor may decrease when the lateral force is applied to the top layer in the opposite lateral direction.

A proximity and three-axis force sensor based sensor may include a first taxel, a second taxel, and a third taxel. The first taxel may include a first electrode formed within a top layer and be configured in a serpentine pattern, a second electrode formed within a bottom layer, and a dielectric layer positioned between the top layer and the bottom layer. The second taxel may include a first electrode formed within the top layer and having a first surface area, a second electrode formed within the bottom layer and having a second surface area, and a ground electrode formed within the top layer above the first electrode of the second taxel and having a surface area greater than the first surface area of the first electrode. The third taxel may include a first electrode formed within the top layer configured in a serpentine pattern and a second electrode formed within the bottom layer. The serpentine pattern of the first electrode of the first taxel and the serpentine pattern of the first electrode of the third taxel may have different surface areas. The second surface area of the second electrode of the second taxel may be different than the first surface area of the first electrode of the second taxel. A first edge of the first electrode of the second taxel may be vertically aligned with a first edge of the second electrode of the second taxel.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIGS. 16A-16D are cross-sectional views of a proximity and three-axis force sensor, according to an exemplary embodiment of the present disclosure;

DETAILED DESCRIPTION

I. System Overview

Figure 1:
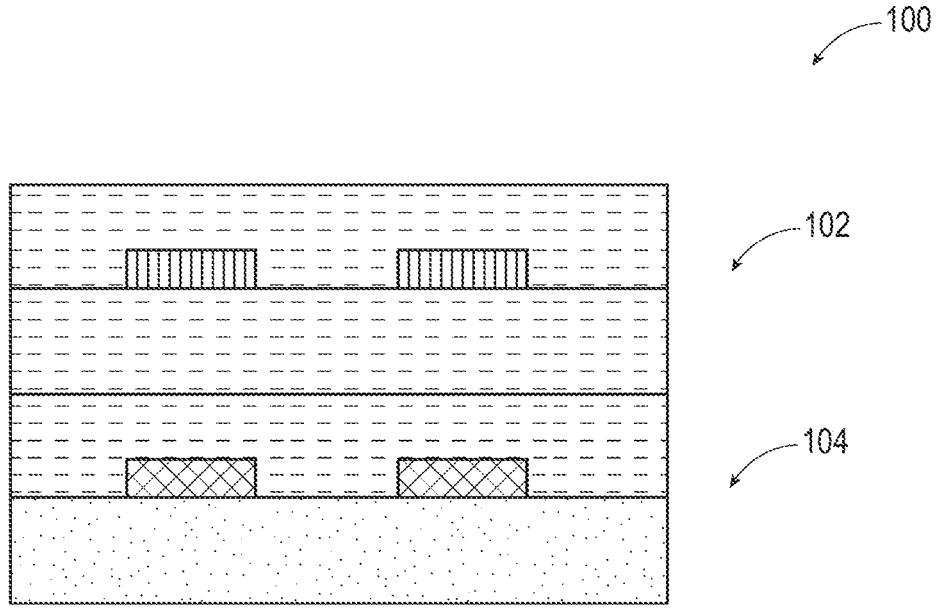
FIG. 1 is a cross-section view of a sensor substrate, according to an exemplary embodiment of the present disclosure.

Referring now to the drawings, wherein the showings are for purposes of illustrating one or more exemplary embodiments and not for purposes of limiting same, FIG. 1 includes a cross-section of the sensor substrate 100 according to an exemplary embodiment of the present disclosure. In one embodiment, a fabrication system may be configured to fabricate the sensor substrate 100 that includes soft sensors to conform to arbitrary smooth geometries to provide a high mechanical robustness and a high level of electronic sensor signal integrity with respect to sensor signals output by the soft sensors.

The fabrication system may leverage the advantages of making devices/circuit boards and soft-sensor technology that enables the fabrication of state-of-the-art conformal tactile sensors. In one embodiment, a set of electrodes of soft sensors that may be bonded upon a sensor substrate may be made of flexible material that provides a conformity needed for proper robotic device sensing (e.g., robotic finger sensing) with conventional materials that are solder-able. This configuration may also provide an interface with readout electronics.

As described in more detail below, the fabrication system may be configured to utilize an additional set of top electrodes that may be made of stretchable conductor material that renders a top segment of the sensor as soft and compliant. The system may also be configured to form a bottom flexible layer 104 that may be composed of a thin sheet of suitable metal that is patterned using photolithography. In one embodiment, the thin sheet of suitable metal may include copper films that are patterned using photolithography. The bottom flexible layer 104 is configured to be in conformity with the arbitrary smooth geometries with smooth segments of small radii of curvatures, to which a high level of conformity may be achieved with a suitable copper film thickness and copper pattern size and shape.

Photolithography is known in the art to have also been implemented in fabricating passive electronic components such as surface mount resistors directly on the circuit boards. The fabrication system may use photolithography as a patterning process to provide a benefit of the process being easily scalable since it may be used to make features in the range of nanometers (used in microchips) all the way to centimeters or larger. Also, the device sizes fabricated using photolithography technology may be scaled all the way from a few millimeters in size to a few meters. The substrate for this fabrication process may be configured as a stretchable adhesive film which enables easy implementation and robust adhesion on a robotic device such as a robot finger/hand. Accordingly, the use of the fabrication method executed by the fabrication system and described in more detail below allows the fabrication of soft sensors that may easily interface with electronics and may provide mechanical and electrical integrity that may be required by a commercial grade product.

As shown in FIG. 1, the sensor substrate 100 may include a top stretchable layer 102 that may be bonded to a bottom flexible layer 104. A bottom portion of the sensor substrate 100 may be configured to include an adhesive portion, such that a bottom face of the bottom flexible layer 104 allows the sensor substrate 100 to robustly adhere one or more types of sensors to/upon any arbitrary geometry. As such, the sensor substrate 100 may be configured to adhere one or more types of sensors on robotic applications, such as robotic hands, fingers, and/or additional types of geometries.

Figure 2A:
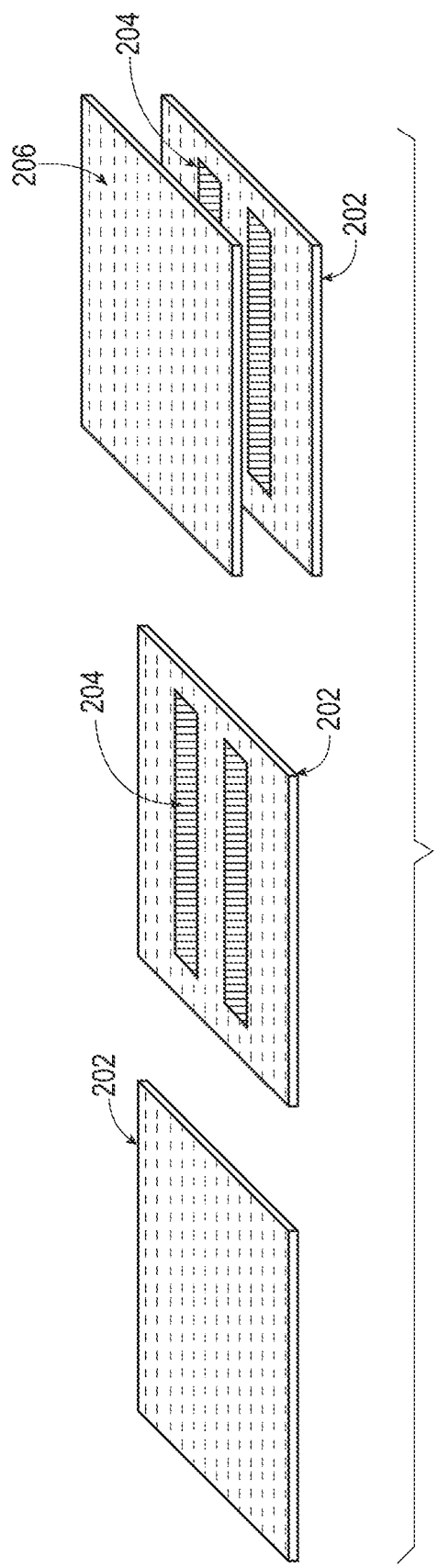
FIG. 2A is an illustrative overview of the fabrication of a top stretchable layer of the sensor substrate, according to an exemplary embodiment of the present disclosure.

FIG. 2A is an illustrative overview of the fabrication of the top stretchable layer 102 of the sensor substrate 100 according to an exemplary embodiment of the present disclosure. As shown, a dielectric layer 202 may be cast as a bottom portion of the top stretchable layer 102. The dielectric layer 202 may be cast in a mold using an elastic material. Accordingly, the top portion of the top stretchable layer 102 may provide a level of elasticity and pliability that may be useful for various robotic sensing actions.

It is appreciated that a wide range of such materials available in the market that range in elastic modulus of 100 kPa (very soft) to 1-2 MPa (fairly rigid) may be utilized to cast the dielectric layer 202 of the top stretchable layer 102. Such materials may closely simulate the mechanical properties of human skin. For example, soft elastic materials such as Ecoflex, Dragon Skin, and the like may be utilized to cast the dielectric layer 202 of the top stretchable layer 102. In some configurations, the dielectric layer 202 may also have structures such as pillars, pyramids, or domes and therefore air gaps, to fine tune the mechanical properties as desired.

With continued reference to FIG. 2A, once the dielectric layer 202 is cast, the fabrication system may pattern the stretchable electrode material into a stretchable electrode pattern 204 with a material using a patterning process of choice. Non-limiting exemplary materials that may be used may include, but may not be limited to, carbon nanotubes, silver nanowires, conducting polymer and/or conducting particle composites. Non-limiting exemplary patterning processes that may be used, but may not be limited to, spray coating shadow masking, and/or screen printing.

In one embodiment, upon the patterning of the stretchable electrodes into the stretchable electrode pattern 204, an encapsulating layer 206 may be cast upon the stretchable electrode pattern 204 using the same or similar elastic material used to cast the dielectric layer 202 of the top stretchable layer 102. For example, the encapsulating layer 206 may be cast in a mold using Ecoflex, Dragon Skin, or other elastic materials.

Figure 2B:
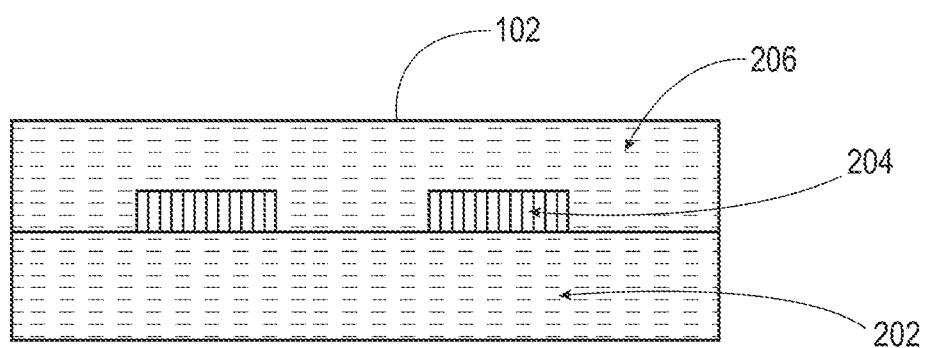
FIG. 2B is a cross-section view of the top stretchable layer of the sensor substrate, according to an exemplary embodiment of the present disclosure.

As shown in FIG. 2B, a cross-section of the top stretchable layer 102 of the sensor substrate 100 according to an exemplary embodiment of the present disclosure, the encapsulating layer 206 is cast upon the stretchable electrode pattern 204. As discussed above, the stretchable electrode pattern 204 is disposed atop of the dielectric layer 202 that may be composed of elastic material.

Figure 3A:
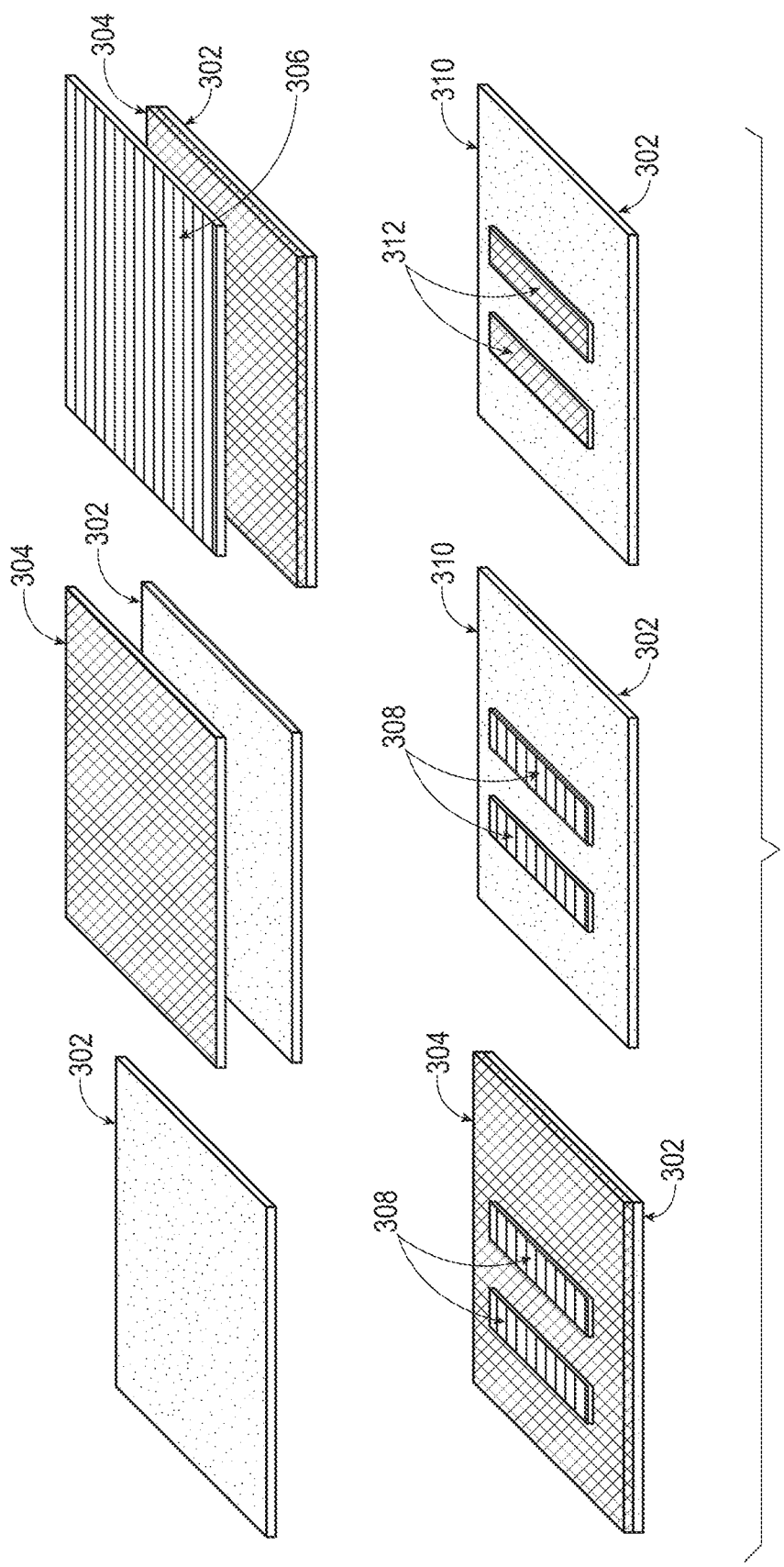
FIG. 3A is an illustrative overview of a bottom flexible layer of the sensor substrate, according to an exemplary embodiment of the present disclosure.

With reference to the bottom flexible layer 104, of the sensor substrate 100, FIG. 3A includes an illustrative overview of the bottom flexible layer 104 of the sensor substrate 100 according to an exemplary embodiment of the present disclosure. In one embodiment, a bottom portion of the bottom flexible layer 104 and consequently the sensor substrate 100 may be configured as a soft adhesive sheet 302. In one configuration, the soft adhesive sheet 302 may be configured as a pliable adhesive sheet that may be flexible for robust adhesion to various arbitrary smooth geometries. The soft adhesive sheet 302 may be configured as a double sided acrylic tape sheet adhesive substrate. As an illustrative example, the soft adhesive sheet 302 may include tape dimensions of 12"×12". It is appreciated that many different sizes of sheets and tape dimensions may be utilized that may include varying properties of mechanical stiffness and chemical stability.

With continued reference to FIG. 3A, a thin sheet of copper film 304 may be laminated upon a top side portion of the soft adhesive sheet 302. Upon the lamination of the copper film 304 upon the soft adhesive sheet 302, a dry film photoresist 306 may be laminated upon a top portion of the copper film 304. In one configuration, the fabrication system may be configured to send instructions to utilize a thermal laminator (not shown) to laminate the dry film photoresist 306 upon the copper film 304. In one embodiment, the dry film photoresist 306 may be exposed through a mask using an ultraviolet source.

In an exemplary embodiment, the fabrication system may be configured to use a developing solution to develop exposed portions of dry film photoresist pattern 308. The exposed portions of dry film photoresist pattern 308 may be utilized as a mask to etch undesired portions of copper of the copper film 304 previously laminated upon the soft adhesive sheet 302. Accordingly, the soft adhesive sheet 302 may include etched copper 310 with respective exposed portions of dry film photoresist pattern 308 that remain upon the soft adhesive sheet 302.

In one embodiment, upon the etching of the undesired copper of the copper film 304 to allow the etched copper 310 to remain upon the soft adhesive sheet 302, the fabrication system may remove the photoresist from the dry film photoresist pattern 308 that remains upon the etched copper 310. Upon the removal of the photoresist, a patterned copper film may remain upon the etched copper 310 of the bottom flexible layer of a sensor substrate. The patterned copper film may be configured as patterned copper electrodes 312 that may be operably connected to a control board (not shown) that is associated with the sensor substrate 100.

Figure 3B:
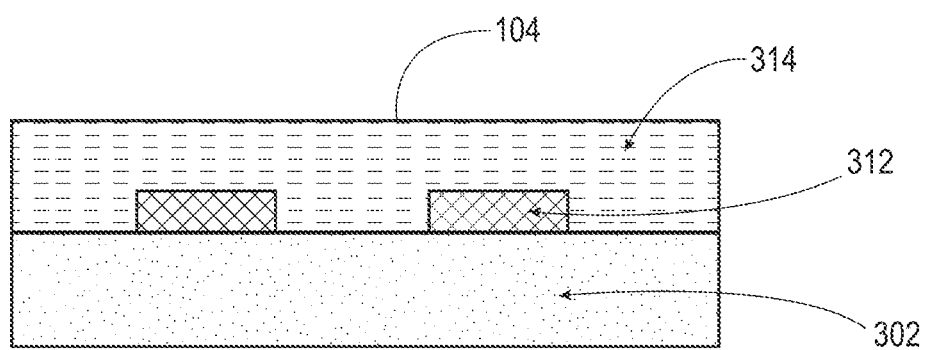
FIG. 3B is a cross-section view of the bottom flexible layer of the sensor substrate, according to an exemplary embodiment of the present disclosure.

FIG. 3B is a cross-section view of the bottom flexible layer 104 of the sensor substrate 100 according to an exemplary embodiment of the present disclosure. In an exemplary embodiment, a top layer of elastic material 314 may be cast upon of the soft adhesive sheet 302 that may be configured as an adhesive substrate. As discussed above, the soft adhesive sheet 302 may include the patterned copper electrodes 312 that may remain upon the etched copper 310 of the bottom flexible layer 104 of the sensor substrate 100.

Figure 4:
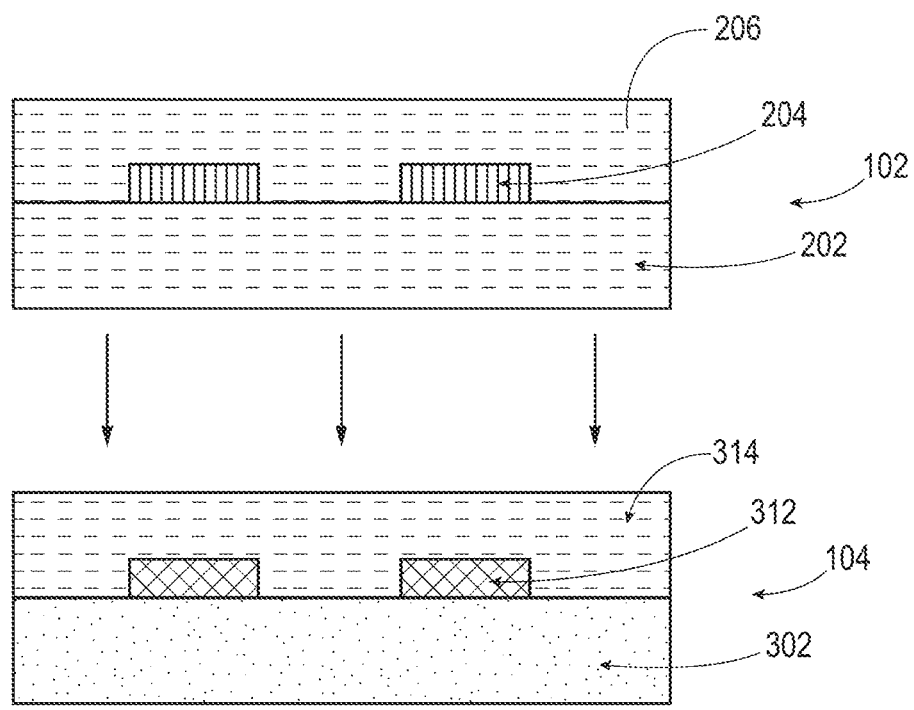
FIG. 4 is an illustrative overview of bonding of the top stretchable layer and the bottom flexible layer, according to an exemplary embodiment of the present disclosure.

FIG. 4 includes an illustrative overview of the bonding of the top stretchable layer 102 and the bottom flexible layer 104 according to an exemplary embodiment of the present disclosure. In an exemplary embodiment, upon the fabrication of the top stretchable layer 102 of the sensor substrate 100 and the bottom flexible layer 104 of the sensor substrate 100, the fabrication system may be configured to bond the top stretchable layer 102 to the bottom flexible layer 104 to form the sensor substrate 100. As shown, the casting of the top layer of elastic material 314 upon the adhesive substrate of the bottom flexible layer 104 may enable a strong adhesion between the dielectric layer 202 that may be composed of elastic material and the layer of elastic material 314 of the bottom flexible layer 104. Accordingly, the top layer of elastic material 314 may be bonded to the bottom flexible layer 104 to form the sensor substrate 100.

Figure 5:
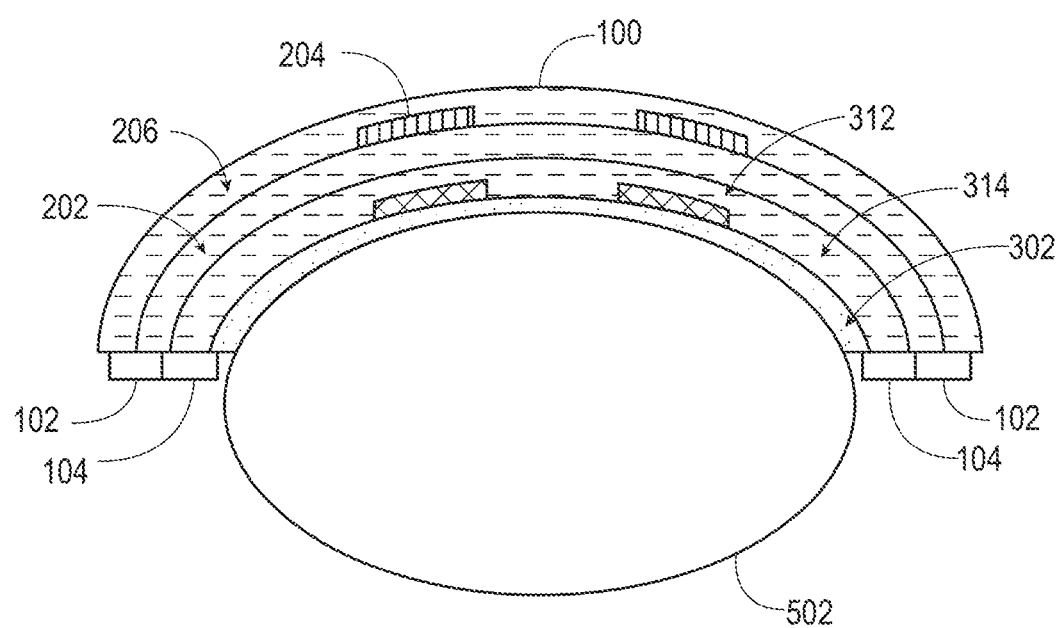
FIG. 5 is an illustrative overview of the bonding of the sensor substrate to an arbitrary smooth geometry, according to an exemplary embodiment of the present disclosure.

FIG. 5 includes an illustrative overview of the bonding of the sensor substrate 100 to an arbitrary smooth geometry according to an exemplary embodiment of the present disclosure. As represented in FIG. 5, upon the fabrication of the sensor substrate 100, the bottom portion that is configured as a soft adhesive sheet 302 may be configured for robust adhesion to a robotic device such as a robot finger/hand 502. In other words, once the sensor fabrication is complete, the sensor substrate 100 which is adhesive on a bottom face is used to adhere the sensor substrate 100 on any arbitrary smooth geometry such as to the robot finger/hand 502. In order to interface with readout electronics, the patterned copper electrodes 312 may include traces that run to the circuit board that is associated with the sensor substrate 100. In one configuration, the traces may be soldered to consequently form a robust connection between the patterned copper electrodes 312 and the circuit board to communicate sensor signals.

In some embodiments, the patterned copper electrodes 312 may be interfaced with copper tape, using crimp connectors on each respective electrode connection trace, and/or using a flexible flat cable connection (exemplary connections not shown). In alternate embodiments, the copper tape and/or the flexible flat cable connection may be soldered on the circuit board. However, it is appreciated that various types of connection techniques may be utilized to operably interface the patterned copper electrodes 312 with the control board that is associated with the sensor substrate 100.

The fabrication system may enable a reduction of the number of interconnects requiring a soft electrode-rigid circuit interface by at least half or even more in case of an asymmetric circuit to enhance the signal integrity by a significant amount. In some configurations, when the sense terminals of the readout hardware are connected using the copper soldered connection, this functionality may provide an additional increase in signal to noise ratio. The utilization of photolithography may enable the fabrication of very complex and dense bottom electrode patterns in asymmetric designs where only one set of electrode patterns need to be more complex than the other.

In one embodiment, a stretchable conductor material with electrode materials (such as copper) may be utilized to achieve a higher signal integrity by moving one half or more of the sensor(s) into the solid electrode material domain. The connection of excitation terminals of the readout electronics to the top stretchable layer 102 and the sense terminals to the patterned copper electrodes 312 of the bottom flexible layer 104 is thereby completed. This functionality ensures a higher signal integrity and clean sense signal which delivers a better signal to noise ratio, when compared to a sensor that has both top and bottom electrodes made of stretchable conductor materials.

Figure 6:
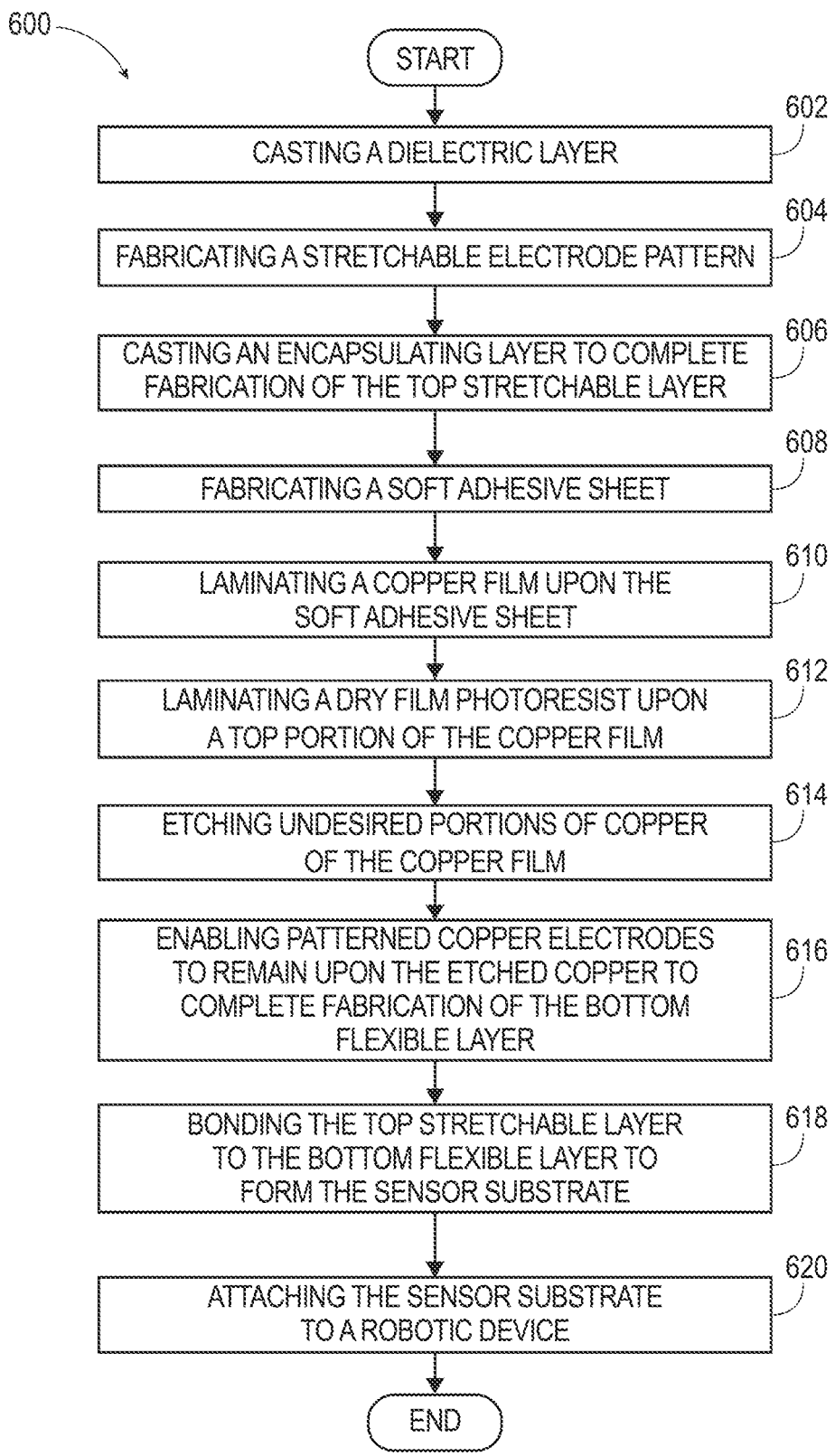
FIG. 6 is a process flow diagram of a method for fabricating the sensor substrate and attaching the sensor substrate to a robotic device, according to an exemplary embodiment of the present disclosure.

II. Methods Implemented to Fabricate Soft Sensors that Confirm to Arbitrary Geometries FIG. 6 is a process flow diagram of a method 600 for fabricating the sensor substrate 100 and attaching the sensor substrate 100 to a robotic device according to an exemplary embodiment of the present disclosure. FIG. 6 will be described with reference to the components of FIGS. 1-5 though it is to be appreciated that the method 600 of FIG. 6 may be used with other systems/components. In one embodiment, the method 600 may be included as computer implemented instructions that are stored within an electronic memory and may be accessed and executed by a processor of a computing system to operably control mechanical equipment (e.g., machinery) to fabricate the top stretchable layer 102 of the sensor substrate 100 and the bottom flexible layer 104 of the sensor substrate 100, and to attach the bonded layers that comprise the sensor substrate 100 to a robotic device.

The method 600 may begin at block 602, wherein the method 600 may include casting a dielectric layer 202. In one embodiment, the fabrication system may begin the fabrication process to fabricate the top stretchable layer 102 of the sensor substrate 100 by casting the dielectric layer 202 as a bottom portion of the top stretchable layer 102. As discussed above, the dielectric layer 202 may be cast in a mold using an elastic material. In some configurations, the dielectric layer 202 may have structures such as pillars, pyramids, or domes to fine tune mechanical properties as desired.

The method 600 may proceed to block 604, wherein the method 600 may include fabricating a stretchable electrode pattern 204. In one embodiment, the fabrication system may fabricate the stretchable electrode pattern 204 with a material of choice using a patterning process of choice. For example, spray coating, shadow mask, and/or screen printing may be utilized to pattern carbon nanotubes, silver nanowires, conducting polymer and/or conducting particle composites as materials of the stretchable electrode pattern 204.

The method 600 may proceed to block 606, wherein the method 600 may include casting an encapsulating layer 206 to complete fabrication of the top stretchable layer 102. In one embodiment, the encapsulating layer 206 may be cast upon the stretchable electrode pattern 204 using the same or similar elastic material used to cast the dielectric layer 202 of the top stretchable layer 102. Accordingly, as shown in FIG. 2B, the encapsulating layer 206 may be cast atop the stretchable electrode pattern 204 which is included upon the dielectric layer 202 to complete fabrication of the top stretchable layer 102.

The method 600 may proceed to block 608, wherein the method 600 may include fabricating a soft adhesive sheet 302. In one embodiment, the fabrication system may begin the fabrication process to fabricate the bottom flexible layer 104 of the sensor substrate 100 by fabricating the soft adhesive sheet 302 as a bottom portion of the bottom flexible layer 104. The soft adhesive sheet 302 may be configured as a double sided acrylic tape sheet that is configured with varying properties of mechanical stiffness and chemical stability.

The method 600 may proceed to block 610, wherein the method 600 may include laminating a copper film 304 upon the soft adhesive sheet 302. In one embodiment, the fabrication system may laminate the thin sheet of copper film 304 upon a top side portion of the soft adhesive sheet 302. In one embodiment, the copper film 304 may be patterned using photolithography. This may enable the fabrication of passive electronic components such as surface mount resistors directly on the circuit board associated with the sensor substrate 100. This functionality enables the ability to design complex electrode designs which otherwise may not be possible to fabricate using alternative processes such as shadow mask patterning of composites.

The method 600 may proceed to block 612, wherein the method 600 may include laminating a dry film photoresist 306 upon a top portion of the copper film 304. Upon the lamination of the copper film 304 upon the soft adhesive sheet 302, the fabrication system may utilize a thermal laminator to laminate a dry film photoresist 306 upon a top portion of the copper film 304.

The method 600 may proceed to block 614, wherein the method 600 may include etching undesired portions of copper of the copper film 304. In an exemplary embodiment, the fabrication system may utilize the exposed portions of dry film photoresist pattern 308 as a mask to etch undesired portions of copper of the copper film 304 previously laminated upon the soft adhesive sheet 302. Accordingly, the soft adhesive sheet 302 may include the etched copper 310 with respective portions of dry film photoresist 306 that remain upon the soft adhesive sheet 302.

The method 600 may proceed to block 616, wherein the method 600 may include enabling patterned copper electrodes to remain upon the etched copper 310 to complete fabrication of the bottom flexible layer 104. In one embodiment, the fabrication system may remove the photoresist, leaving the patterned copper electrodes 312. The patterned copper electrodes 312 may include traces that run to the circuit board that is associated with the sensor substrate 100. Accordingly, as shown in FIG. 3B, the bottom flexible layer 104 may be fabricated with the soft adhesive sheet 302 that includes the patterned copper electrodes 312 that are included upon the etched copper 310. The bottom flexible layer 104 may be configured to be in conformity with the arbitrary smooth geometries with smooth segments of small radii of curvatures, to which a high level of conformity may be achieved with a suitable copper film thickness and copper pattern size and shape.

The method 600 may proceed to block 618, wherein the method 600 may include bonding the top stretchable layer 102 to the bottom flexible layer 104 to form the sensor substrate 100. In one embodiment, upon the fabrication of the top stretchable layer 102 of the sensor substrate 100 (at block 606) and the bottom flexible layer 104 of the sensor substrate 100 (at block 616), the fabrication system may be configured to bond the top stretchable layer 102 to the bottom flexible layer 104 to form the sensor substrate 100. In one embodiment, the top layer of elastic material 414 may include an adhesive coating that may enable a strong adhesion between the dielectric layer 202 of the top stretchable layer 102 and the layer of elastic material 414 of the bottom flexible layer 104. Accordingly, the top stretchable layer 102 may be bonded to the bottom flexible layer 104 to form the sensor substrate 100.

The method 600 may proceed to block 620, wherein the method 600 may include attaching the sensor substrate 100 to a robotic device. In an exemplary embodiment, upon the completion of the sensor fabrication, the sensor substrate 100, which is adhesive on the bottom face may be placed upon any arbitrary geometry to be robustly adhered to the arbitrary geometry. As discussed above with respect to FIG. 5, once the sensor fabrication is complete, the sensor substrate 100 which is adhesive on a bottom face is used to adhere the sensor substrate 100 on any arbitrary smooth geometry such as to the robot finger/hand 502.

Since the fabrication system utilizes the soft adhesive sheet 302 as the base of the sensor substrate 100, robust adhesion arbitrary smooth geometry such as to the robot finger/hand 502 is achieved with little risk of delamination as the robotic device interacts with the physical world. Additionally, this functionality also ensures robust adhesion of the patterned copper electrodes 312 on the sensor substrate 100 and also the top elastic layers that are built upon it.

Figure 7:
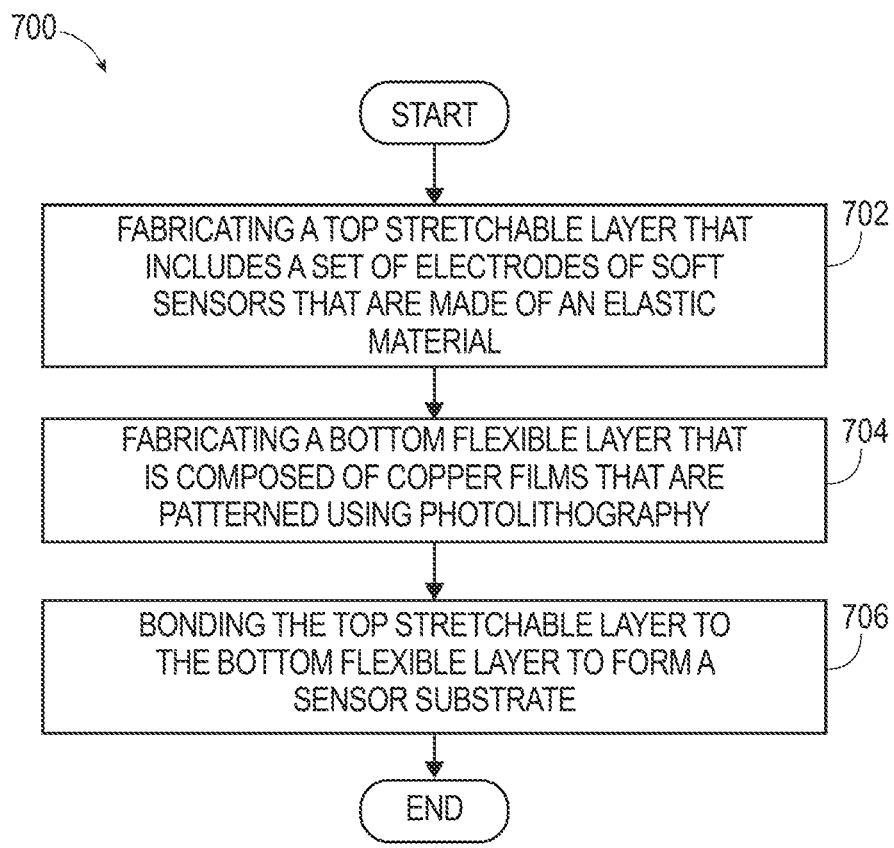
FIG. 7 is a process flow diagram of a method for fabricating soft sensors that conform to arbitrary smooth geometries, according to an exemplary embodiment of the present disclosure.

FIG. 7 is a process flow diagram of a method for fabricating soft sensors that conform to arbitrary smooth geometries according to an exemplary embodiment of the present disclosure. FIG. 7 will be described with reference to the components of FIGS. 1-5 though it is to be appreciated that the method 700 of FIG. 7 may be used with other systems/components. The method 700 may begin at block 702, wherein the method 700 may include fabricating a top stretchable layer 102 that includes a set of electrodes of soft sensors that are made of an elastic material.

The method 700 may proceed to block 704, wherein the method 700 includes fabricating a bottom flexible layer 104 that is composed of copper films that are patterned using photolithography. In one embodiment, the bottom flexible layer 104 is configured to be in conformity with the arbitrary smooth geometries. The method 700 may proceed to block 706, wherein the method 700 includes bonding the top stretchable layer 102 to the bottom flexible layer 104 to form a sensor substrate 100. In one embodiment, the sensor substrate 100 is configured as a stretchable adhesive film which enables robust adhesion to the arbitrary smooth geometries.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 8:
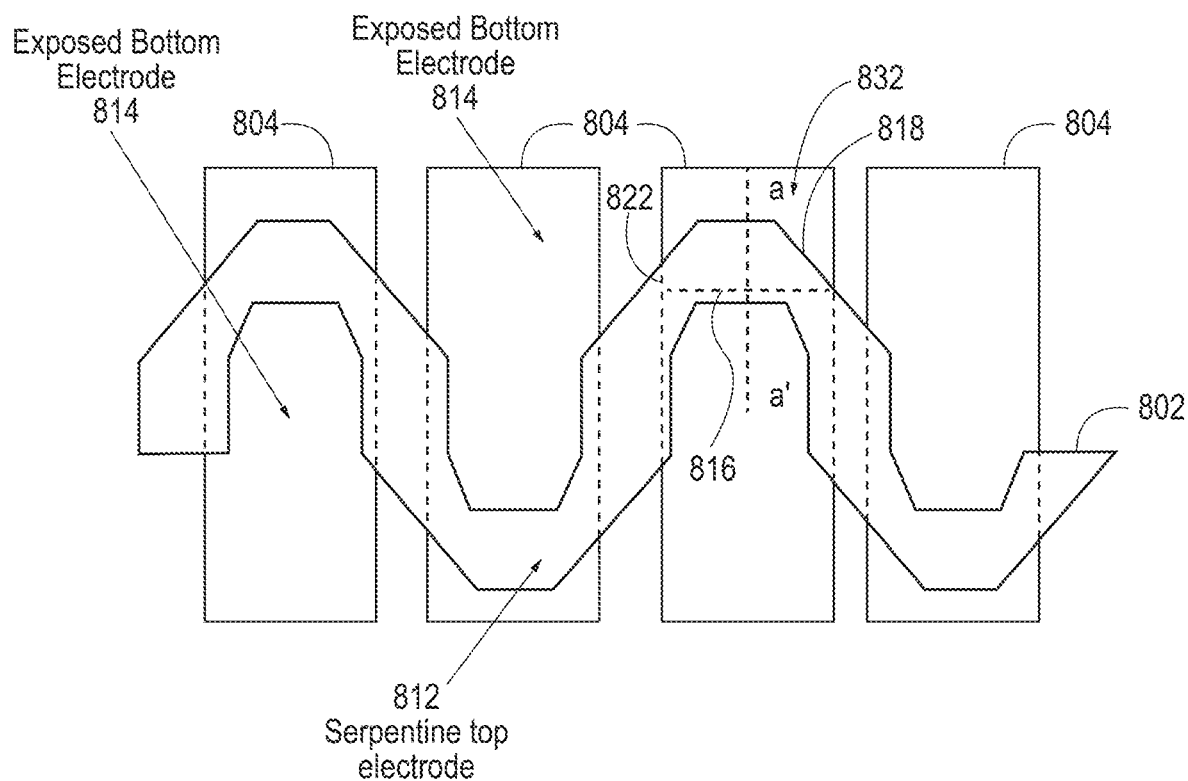
FIG. 8 is an illustrative overview of a mutual and overlap capacitance based sensor having a smooth geometry, according to an exemplary embodiment of the present disclosure.

FIG. 8 is an illustrative overview of a mutual and overlap capacitance based sensor 800 having a smooth geometry, according to an exemplary embodiment of the present disclosure. The mutual and overlap capacitance based sensor of FIG. 8 may include a top layer 802 and a bottom layer 804. According to one aspect, the top layer 802 may be, for example, the top stretchable layer 102 described above (e.g., including one or more of the encapsulating layer 206, the stretchable electrode pattern 204, and the dielectric layer 202) and the bottom layer 804 may be the bottom flexible layer 104 described above (e.g., including one or more of the layer of elastic material 310, the patterned electrodes 312, and the soft adhesive sheet 302). As seen in FIG. 4, the dielectric layer 202 is positioned between the stretchable electrode pattern 204 and the patterned electrodes 312 or otherwise between the first electrode and the second electrode.

The top layer 802 may include a first electrode 812. The bottom layer 804 may include a second electrode 814. As seen in FIG. 8, the second electrode 814 has a line shape or rectangular shape which runs perpendicular to a wavelength direction 816 of the first electrode 812 and parallel to an amplitude direction (i.e., line a-a') of the first electrode 812. The top stretchable layer 102 may include the first electrode 812, which may be the stretchable electrode pattern 204 described above and may be arranged or configured in a serpentine pattern. Described in another way, the first electrode 812 may be shaped similarly to a sine wave.

In this way, the first electrode 812 may have an architecture that enables both proximity and pressure sensing without the need for electrode switching while providing the location of the proximity along both horizontal axes. This may be achieved, for example, using a combination of soft stretchable electrodes and copper film electrodes leveraging the advantages of both materials. The conformity and softness may be realized by the dielectric layer 202 made of elastomer (e.g., Ecoflex 00-30) typically used to make face masks for movie props, and the top electrode made of a highly stretchable carbon composite. The bottom layer may include copper film electrodes for robust interconnection with the readout hardware.

This shape may be further optimized according to application specific requirements for sensitivity of either mode of sensing, meaning that other shapes are contemplated. For example, an electrode design that maximizes the length of a contour 818 of the top electrode and an overlap area between the top and bottom electrode may be considered. As another example, an electrode design with both overlapping and exposed areas may be utilized.

The first electrode 812 may be arranged such that a first portion 822 of the first electrode 812 overlaps the second electrode 814. The first electrode 812 may be arranged such that the first portion 822 of the first electrode 812 may include a contour. The first electrode 812 may be arranged such that a first portion 832 of the second electrode 814 includes an exposed area not covered by the first electrode 812. A second portion 834 of the second electrode 814 may include a covered area covered by the first electrode 812 while the first portion 832 of the second electrode 814 may include an exposed area not covered by the first electrode 812.

The first portion 832 of the second electrode 814 may be associated with a first taxel of the mutual and overlap capacitance based sensor and the second portion 834 of the second electrode 814 may be associated with a second taxel of the mutual and overlap capacitance based sensor.

A processor, described in greater detail below, may determine a sensing mode based on a capacitance reading from the first taxel being within a first range, a second range, or between the first range and the second range and a reading from the second taxel. The first taxel may neighbor the second taxel. The sensing mode may be a mutual capacitance mode or an overlap capacitance mode.

The sensor may utilize a combination of capacitive sensing techniques: 1) mutual capacitance for proximity sensing and 2) overlap capacitance for pressure sensing. The sensor may use a novel electrode architecture that has both exposed and overlapping electrode areas, thereby enabling both mutual and overlap capacitive modes simultaneously, as demonstrated in FIG. 9.

Figure 9:
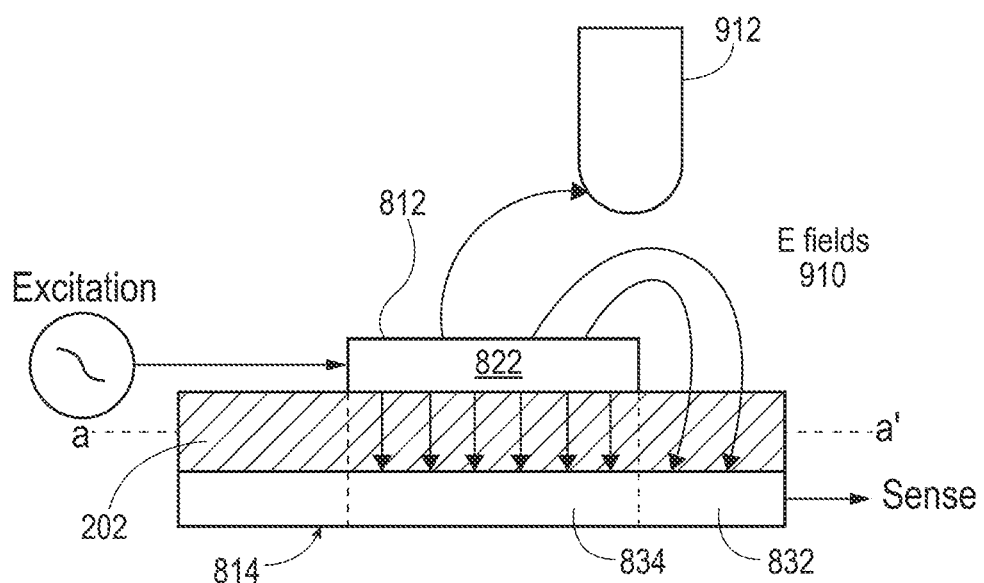
FIG. 9 is a cross-sectional view of a mutual and overlap capacitance based sensor having a smooth geometry, according to an exemplary embodiment of the present disclosure.

FIG. 9 is a cross-sectional view of a mutual and overlap capacitance based sensor having a smooth geometry, according to an exemplary embodiment of the present disclosure. FIG. 9 illustrates that mutual capacitance changes even if the electrodes are not co-planar (e.g., along line a-a') as long as the bottom electrode is exposed. A serpentine pattern may be implemented for the top electrodes (e.g., the first electrode 812) to balance between two modes: 1) for mutual capacitance, the edge contour 818 length of the top electrode 812 may be maximized, according to one aspect, because most of the electric field coupling between the excitation and sense electrodes occurs at the edges and 2) for overlap capacitance, the overlap area 822 may be maximized.

The sensor or capacitive sensor described herein has two distinct advantages: 1) a top electrode architecture that allows both proximity and pressure sensing without the need for electrode switching while providing the location of the proximity along both horizontal axes, and 2) a combination of soft stretchable electrodes and copper film electrodes leveraging the advantages of both materials. The conformity and softness are realized by the dielectric layer (e.g., 202) made of elastomer typically used to make face masks for movie props, and the top electrodes made of a highly stretchable carbon composite. The bottom layer may include copper film electrodes for robust interconnection with the readout hardware. The fabrication process combines conventional methods, making it straightforward to work with curved surfaces and scale depending on applications.

As seen in FIG. 9, the second portion 834 of the second electrode 814 may include a covered area 834 covered by the first electrode 812 while the first portion 832 of the second electrode 814 may include an exposed area 832 not covered by the first electrode 812. In this way, mutual capacitance and overlap capacitance readings may be provided by the same mutual and overlap capacitance based sensor. The first electrode 812 and the second electrode 814 are stacked in a vertical orientation, but due to the covered area 834 and the exposed area 832, mutual capacitance still exists between the non-co-planar electrodes, indicated at 910, as a human finger 912 approaches the sensor 800.

When the finger 912 makes contact with the first electrode 812, and applies a downward force, overlap capacitance between the first electrode 812 and the second electrode 814 may increase, thereby creating a reading at the associated sensor taxel.

According to one aspect, the sensor 800 of FIG. 8 may be made of soft, stretchable material and is therefore conformable to smooth curved surface of robot links. The sensor 800 may also be fabricated in different sizes from fingertips to torso because the fabrication process employs scalable methods. Recognizing gentle contact gestures often seen in affectionate physical interactions may be possible based on the dual mutual and overlap capacitance detection abilities of this sensor. Further, spatio-temporal information of the 2D capacitance data obtained from the sensor may be applied using deep neural network architectures.

The contribution of this sensor 800 may be twofold. First, the multi-modal capacitance-based sensor architecture may detect proximity and near-zero force contacts, as well as large forces. Multi-modal sensing may be achieved by combining two sensing modalities normally used separately: pressure sensing based on overlap capacitance that depends on the distance between two overlapping electrodes (e.g., distance between the second portion 834 of the second electrode 814 and the first electrode 812), and proximity sensing based on mutual capacitance (also known as projected capacitance), which may be used in touch-screen devices. Stated another way, this sensor uses a combination of capacitive sensing techniques: 1) mutual capacitance for proximity sensing and 2) overlap capacitance for pressure sensing.

Mutual capacitance is the capacitance between two electrodes (e.g., excitation and sense) and may be used in touch screens. Typically, the electrodes may be placed on the same plane and, as a result, the coupling electric field projects out of the plane from the excitation electrode and returns back to the sense electrode. As a human finger approaches the sensor, the electric field couples with the finger and the coupling between the capacitive electrodes, Cs, decreases. The magnitude of the capacitance decrease increases as the finger comes closer to the sensor surface. For a mutual capacitive sensor to function, both excitation and sense electrodes are exposed to enable the electric field to project outward and couple with a finger.

Overlap capacitance refers to the capacitance that is inversely proportional to the distance between two overlapping electrodes: $C_S = eA/d$ where e is the permittivity, A is the overlap area, and d is the distance between the electrodes. Upon application of a normal force, decrease in d causes an increase in capacitance $C_S$.

The mutual and overlap capacitance based sensor 800 may utilize a novel electrode architecture that has both exposed and overlapping electrode areas as shown in FIGS. 8-9, thus enabling both mutual and overlap capacitive sensing modes to occur simultaneously. FIG. 9 illustrates that mutual capacitance changes even if the electrodes 812, 814 are not co-planar as long as the bottom electrode is exposed. The selection of a serpentine pattern for the top electrodes enables balance between two modes: 1) for mutual capacitance, the edge contour length 818 of the top electrode may be maximized because most of the electric field coupling between the excitation and sense electrodes occurs at the edges and 2) for overlap capacitance, the overlap area 822 may be maximized. This shape may however be further optimized according to specific application requirements for sensitivity of either mode of sensing.

Figure 10:
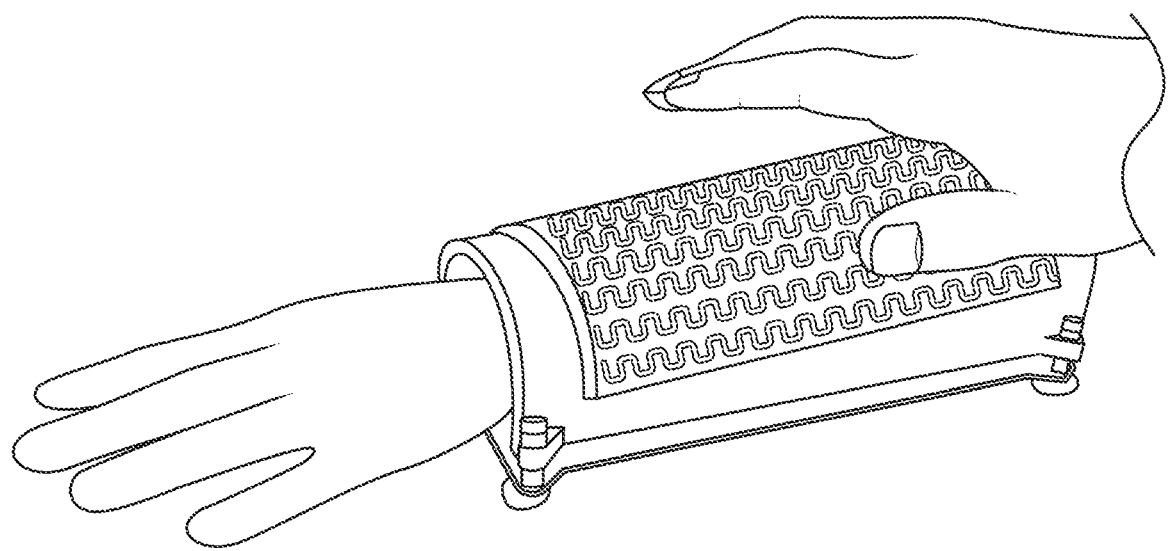
FIG. 10 is an illustrative overview of an exemplary mutual and overlap capacitance based sensor having a smooth geometry, according to an exemplary embodiment of the present disclosure.

FIG. 10 is an illustration of an exemplary mutual and overlap capacitance based sensor having a smooth geometry, according to an embodiment of the present disclosure. A capacitance-based sensor array architecture for physical human-robot interaction (pHRI) applications that may measure proximity, near-zero-force (NZF) contacts, and pressure between a robot and human body may be provided by duplicating the sensor of FIG. 8 according to an array architecture, for example.

According to one aspect, a carbon composite may be utilized for the top electrodes, while using thin copper film for the bottom electrodes, taking advantage of the fact that the bottom layer may be attached to a rigid robot body part and therefore need to be conformable but not necessarily stretchable. Furthermore, the copper electrodes may be connected to a sense terminal of the readout circuit because the copper may be more critical to signal quality than the excitation terminal. The sensor may utilize crimp connectors for the top electrodes made of stretchable carbon composite.

According to one aspect, the mutual and overlap capacitance based sensor 800 may include of top and bottom layers of strip-shaped electrodes 814 running perpendicularly to each other, separated by the dielectric layer 202. Each intersection of a pair of top and bottom electrodes may provide a capacitance measurement and may be considered or grouped as 'a taxel'. One implementation may have 160 taxels over an area of 20 cm×15 cm, but the fabrication process may be scalable and therefore suitable for installation on both small (e.g. fingertip) and large (e.g. limbs and torso) areas. The mutual and overlap capacitance based sensor 800 may use stretchable carbon composites for the top electrodes and elastomer for the dielectric layer to make the sensor stretchable and conformable, while using thin films of copper for the bottom electrodes for robust interconnection to readout hardware and hence better signal integrity.

Fabrication of the mutual and overlap capacitance based sensor may include I) patterning copper film electrodes, II) fabricating soft top electrodes and dielectric, and III) bonding top and bottom segments. This process may be highly scalable. Also, large area sensors (for full body) may be fabricated just as easily as small area counterparts (for fingertips) by utilizing dry-film photoresists that may be laminated on large substrates.

In step I, according to one aspect, a copper film of thickness 100 μm may be laminated on a stretchable adhesive sheet 3M-9495LE of thickness 170 μm. A dry film photoresist may be then thermally laminated using a laminator (e.g., Akiles Pro-Lam) at a temperature of 110° C. at a speed setting of 10 mm/sec. The photoresist may then be exposed through a shadow mask using a UV lamp (365 nm) for 60 sec. The exposed photoresist may be then developed using a developer solution of 1% (wt/wt) NaHCO3. Once exposed, the copper film may be etched using a Ferric Chloride solution (e.g., MG Chemicals). Finally, the photoresist may be stripped using a 1% (wt/wt) NaOH solution. The copper electrodes have extended parts that may be later directly soldered onto a readout system.

Step II may include molding the dielectric layer using soft elastomer (e.g., Ecoflex 00-30) in a mold with an inverted pyramid pattern. The pyramids may have a square base of 1.5 mm×1.5 mm, a height of 1.5 mm and a draft of 10 degrees. The pitch of the pyramids may be 1 mm edge to edge. This dielectric architecture provides higher sensitivity to normal forces as opposed to a solid dielectric and may be further tuned to obtain an application-specific elastic modulus. Part A and Part B of Ecoflex may be mixed in equal quantities and poured in the mold. The uncured elastomer may be then degassed in a vacuum chamber until all the air may be removed. The elastomer may be then cured at 60° C. for 20 min. It may be also possible to cure the elastomer at room temperature for 4 hours. Once cured, the stretchable carbon composite may be patterned on top of the surface of the dielectric using a shadow mask to form the top electrodes. The shadow mask may be cut out using a laser cutter (e.g., Dremel LC40). The carbon composite may be formed by mixing 100 mg of Carbon Nanofibers (e.g., Sigma-Aldrich 719781), 300 mg of Carbon Black (e.g., Alfa Aesar—H30253) and 2 gm of Ecoflex 00-30 Part A and 2 gm of Part B. A Thinky planetary centrifuge (e.g., ARE 310) may be used to mix the composite at 2000 rpm for 5 min. The carbon composite pattern may be then cured at 60° C. for 20 min. The terminals of the electrode traces may be wrapped using a standard crimp connector that may then be soldered on to the readout circuit similarly to the copper electrode traces. Finally, an encapsulating layer of the same elastomer may be formed on top of the exposed carbon composite electrodes.

Step III may include applying a thin layer of uncured Ecoflex 00-30 mixture on the copper film electrodes and placing the top segment on it. This assembly may be then cured at 60° C. for 20 min ensuring strong adhesion between the top and bottom segments. The adhesive substrate 3M-9495LE, on which the sensor may be built, adheres to smooth curved surface as shown in FIG. 10.

Figure 11:
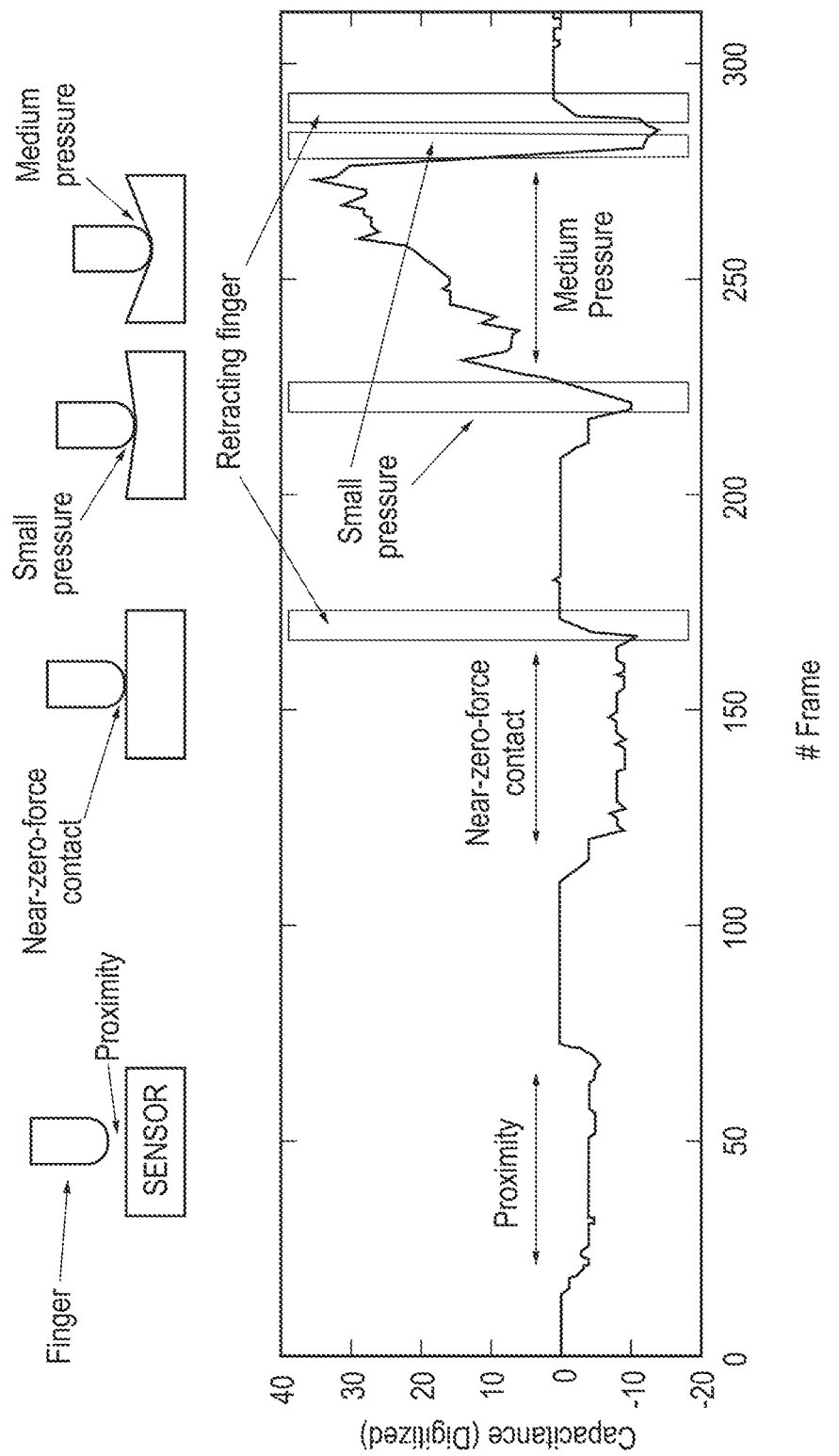
FIG. 11 is an operation diagram associated with the mutual and overlap capacitance based sensor, according to an exemplary embodiment of the present disclosure.

One issue with this sensor architecture may be an ambiguity between proximity and small pressure, as depicted in FIG. 11. When a human finger comes close to or barely touches the sensor (e.g., NZF contact), mutual capacitance decreases compared to the baseline value. As the finger increases the pressure, measured capacitance increases due to increased overlap capacitance and eventually exceeds the baseline. When the measured capacitance is below the baseline, therefore, it may be difficult to distinguish proximity and small pressure using merely the capacitance value of a single taxel. This ambiguity, however, may be resolved using the information from the neighboring taxels that are stimulated due to the proximity effect.

Figure 12:
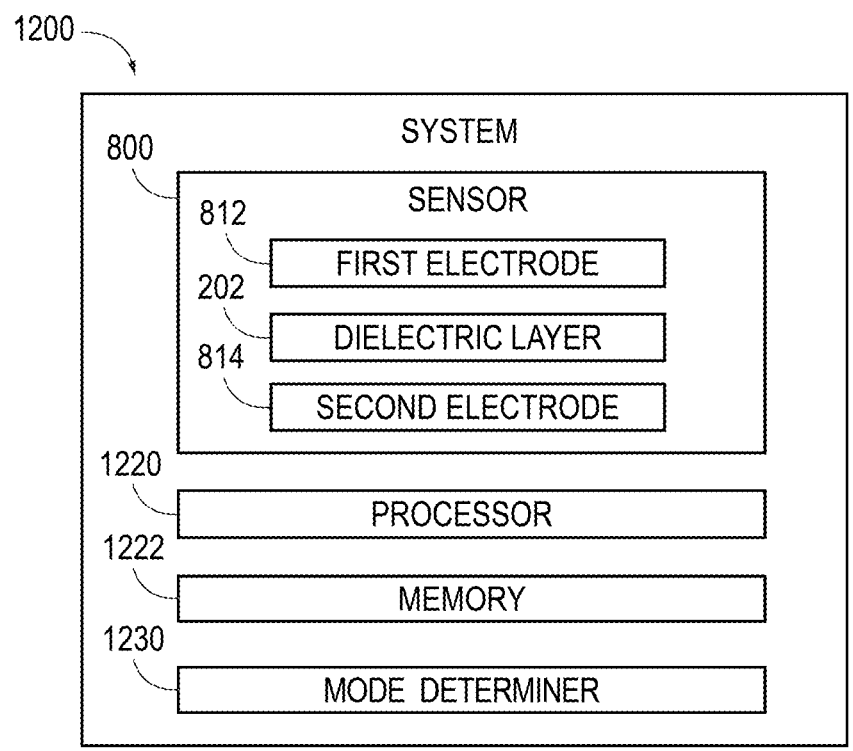
FIG. 12 is a component diagram of an exemplary system for mutual and overlap capacitance based sensing, according to an exemplary embodiment of the present disclosure.

In this regard, recognizing contact gestures involving proximity, NZF contacts, and large pressure may be achieved by applying deep neural network (DNN) architectures to time-series capacitance data from the sensor, such as a 3D Convolutional Neural Network (3DCNN) and Convolutional Long-Short Term Memory (ConvLSTM) in a class gesture recognition problem including non-contact gestures (e.g., hover and air-stroke), NZF (e.g., light touch, light stroke, tickle), and pressure-based (e.g., hard stroke and massage) gestures, in addition to the baseline (e.g., no interaction), using the system 1200 of FIG. 12. According to one experiment between the two models, 3DCNN demonstrated a higher accuracy than the ConvLSTM with a test dataset obtained separately from the training dataset.

FIG. 11 is an operation diagram associated with the mutual and overlap capacitance based sensor, according to an exemplary embodiment of the present disclosure. As discussed above, there may be an ambiguity between proximity and light touch when the capacitance of a taxel is below the baseline. Again, this ambiguity may be resolved by applying pattern recognition techniques to the time-varying 2D capacitance data from all neighboring taxels.

For example, with reference to a response of an array of 3×3 taxels when a finger approaches and applies a small and a medium pressure to the middle taxel of the 3×3 taxel grid. During approach, the capacitance of the middle taxel decreases while the neighboring taxels experience a smaller decrease due to the larger distances. When the finger touches the middle taxel, the neighboring taxels still continue to register decreased capacitance. From this point on when the finger applies a small pressure, the middle taxel start to see an increase in capacitance since the dielectric thickness decreases while the capacitance at the neighboring taxels further decreases. This continues up to the point where the capacitance of the middle taxel returns to the baseline value. Using the information from the neighboring taxels, the system of FIG. 12 may therefore differentiate between proximity and small pressure with the same sensor array. In this way, the processor and mode determiner of FIG. 12 may differentiate between different type of touches or gestures from a user. Two DNN architectures that have been used for similar recognition problems using spatio-temporal data may include ConvLSTM and 3DCNN. However, other models, including classical ones, such as hidden-Markov models (HMM) may be utilized.

FIG. 12 is a component diagram of an exemplary system 1200 for mutual and overlap capacitance based sensing, according to an exemplary embodiment of the present disclosure. The system 1200 for mutual and overlap capacitance based sensing may include the mutual and overlap capacitance based sensor 800 of FIG. 8, which may include the first electrode 812, the second electrode 814, and the dielectric layer 202. The first electrode 812 may be the stretchable electrode pattern 204 configured in a serpentine pattern or shaped as a sine wave. The system 1200 for mutual and overlap capacitance based sensing may include a processor 1220, a memory 1222, and a mode determiner 1230.

The mode determiner 1230 may be implemented via the processor 1220 and the memory 1222 and may determine a sensing mode for the mutual and overlap capacitance based sensor. The mode determiner 1230 may determine the sensing mode to be a mutual capacitance mode or an overlap capacitance mode, for example. According to one aspect, the mode determiner 1230 may determine the sensing mode based on a capacitance reading from a first taxel of the mutual and overlap capacitance based sensor 800 and/or a capacitance reading from a second taxel of the mutual and overlap capacitance based sensor 800.

When the capacitance reading from the first taxel is within a first range, the mode determiner 1230 may set the operating mode of the mutual and overlap capacitance based sensor 800 to be overlap capacitance mode. When the capacitance reading from the first taxel is within a second range, the mode determiner 1230 may set the operating mode of the mutual and overlap capacitance based sensor 800 to be mutual capacitance mode. When the capacitance reading from the first taxel is between the first range and the second range, the mode determiner 1230 may consider the capacitance reading from the second, neighboring taxel prior to setting the operating mode.

Specifically, during an approach of a finger, the capacitance of the first taxel decreases, while the neighboring taxels experience a smaller decrease than the first taxel, and thus, the mode determiner 1230 may set the operating mode to be mutual capacitance mode based on the capacitance reading from the first taxel being between the first range and the second range and based on neighboring taxels experiencing a smaller decrease than the first taxel between subsequent readings.

Additionally, when the finger applies a small pressure (e.g., NZF), the capacitance of the first taxel increases, while the neighboring taxels experience a decrease, and thus, the mode determiner 1230 may set the operating mode to be the overlap capacitance mode based on the capacitance reading from the first taxel being between the first range and the second range and based on the reading from the first taxel increasing while the readings from neighboring taxels decreasing.

According to one aspect, capacitance measurements at 16×10=160 taxels may be recorded at a rate of 8 Hz through a serial port with a baud rate of 115200, although any number of total taxels and different refresh rates may be implemented. The baseline capacitance magnitude at each taxel may be recorded at the beginning of a sequence and may be subtracted from subsequent measurements to effectively 'zero out' readings.

A training sequence may be obtained for each gesture by recording a single sequence continuously while the gesture may be repeated 30-40 times with a gap of a few seconds in between. Data from all 160 taxels may be recorded during the training sequence of the tickle gesture. Testing dataset may be obtained separately by a similar procedure while the same person performs the gestures with fewer repetitions on a different day.

In order to generate the training dataset, each sequence may be first divided into active sections where a gesture may be performed and baseline sections where there may be no interaction. Given the noise level, a frame may be marked as active if the difference from the baseline value of at least one taxel may be equal to or above a threshold. The training dataset may be generated by scanning the active sections using a sliding window of width w with additional p frames of padding from the preceding baseline section in order to detect interactions early. Active sections shorter than w−p may be discarded.

Two DNN architectures were tested: 3DCNN and ConvLSTM, although other architectures may be implemented. These models were chosen because they have been used for modeling spatio-temporal information in RGBD data, which is similar to the tactile data obtained by the sensor. A stopping condition for training may be $a_{i+1} < a_i + 0.1$ where al (%) may be the training accuracy after the i-th epoch.

3D CNN

Two layers of 3D CNN of kernel size 3×3×3 may be followed by four fully-connected dense layers with the rectified linear unit (ReLU) activation function, whose outputs go through a softmax function to recognize six gestures in addition to the baseline (no interaction) case. The 3D CNN layers may be fully connected and each layer runs 30 sets of CNN operation on a tensor of size 16×10×w, resulting in an output tensor of size 16×10×w×30. The sizes of the dense layers may be determined to achieve high accuracy while preventing overfitting.

A popular choice for prediction problems involving time-series data are recurrent neural networks (RNN) such as Long-Short Term Memory (LSTM). A LSTM unit may take the measurement Xt at time t and ht−1 the output of the previous unit as inputs, and calculates the output ht. In order to avoid the vanishing gradient issue and retain long term dependencies, LSTM uses a set of gates to set the significance of a unit, using a state memory.

ConvLSTM

The sensor may use a variant of LSTM called ConvLSTM as a part of the DNN architecture for gesture recognition. In ConvLSTM, both input-state and state-state transitions may be replaced by the 2D convolution operation. The rest of the architecture may be based on the "peephole connection" variant of the standard LSTM. Spatial and temporal information may be retained by 2D convolution and LSTM architecture, respectively.

According to one aspect, each frame goes through 30 sets of 2D convolutional operation before fed into an LSTM unit. Input and output of an LSTM unit therefore has a size of 16×10×30. The sensor may use two layers of LSTM followed by fully-connected dense layers of the same size and activation functions as in the 3D CNN model. However, in this case only the output of the last LSTM unit may be fed into the dense layer network as opposed to a 3D array as in the case of 3DCNN because the 2D array may be expected to retain both spatial and temporal relations. As a result, ConvLSTM requires much fewer parameters to be trained in the dense network.

Figure 13:
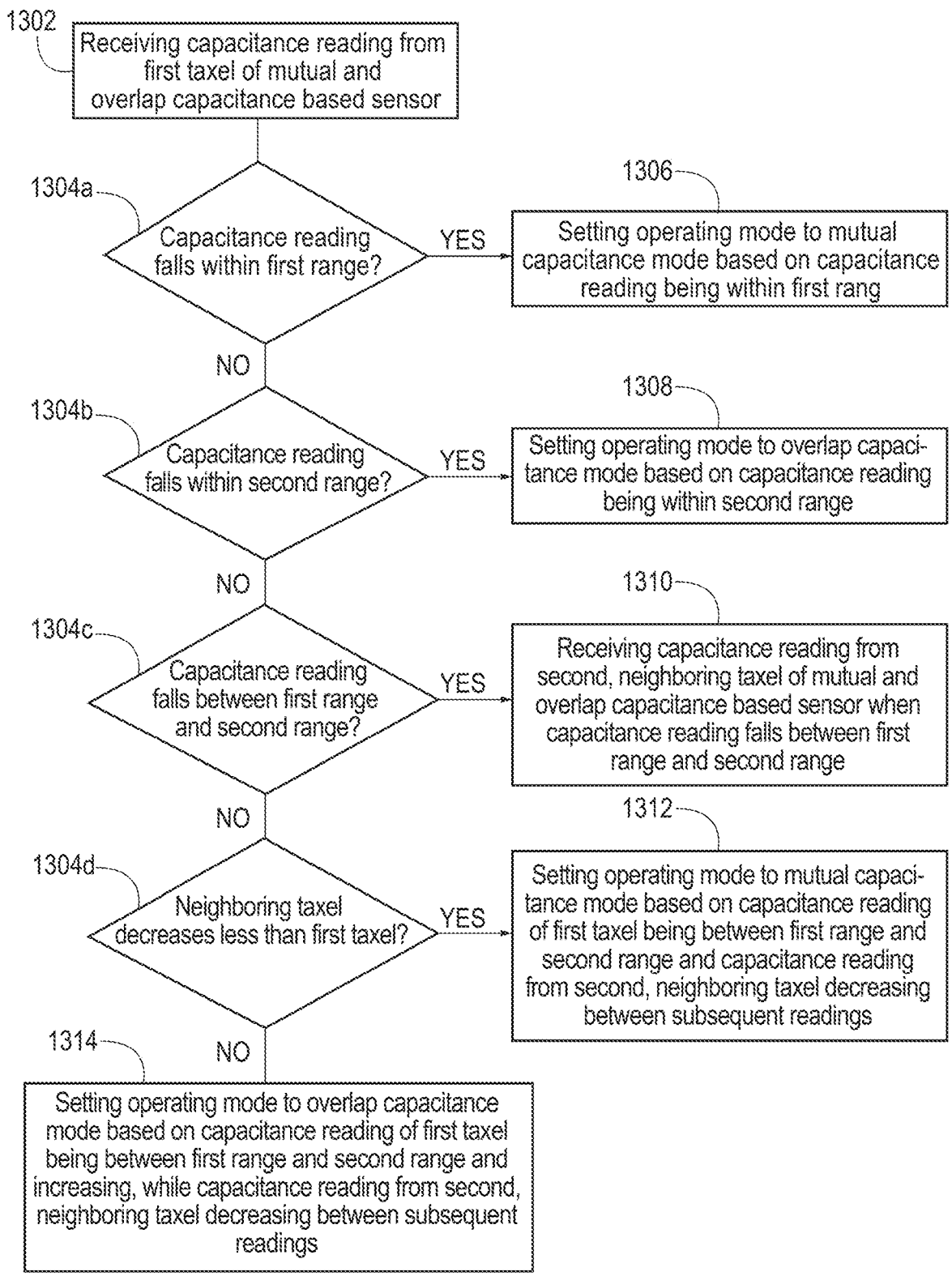
FIG. 13 is a flow diagram of an exemplary method for mutual and overlap capacitance based sensing, according to an exemplary embodiment of the present disclosure.

FIG. 13 is a flow diagram of an exemplary method 1300 for mutual and overlap capacitance based sensing, according to an exemplary embodiment of the present disclosure. According to one aspect, the method 1300 for mutual and overlap capacitance based sensing may include receiving 1302 a capacitance reading from a first taxel of a mutual and overlap capacitance based sensor, determining whether the capacitance reading falls within a first range 1304a, a second range 1304b, or between the first range and the second range 1304c, setting 1306 an operating mode to a mutual capacitance mode based on the capacitance reading being within the first range, setting 1308 the operating mode to an overlap capacitance mode based on the capacitance reading being within the second range, receiving 1310 a capacitance reading from a second, neighboring taxel of the mutual and overlap capacitance based sensor when the capacitance reading falls between the first range and the second range, determining 1312 whether the capacitance reading from the second, neighboring taxel decreases less than the capacitance reading from the first taxel between subsequent readings, setting 1314 the operating mode to the mutual capacitance mode based on the capacitance reading of the first taxel being between the first range and the second range and the capacitance reading from the second, neighboring taxel decreasing between subsequent readings, and setting 1316 the operating mode to the overlap capacitance mode based on the capacitance reading of the first taxel being between the first range and the second range and increasing, while the capacitance reading from the second, neighboring taxel decreasing between subsequent readings.

Figure 14:
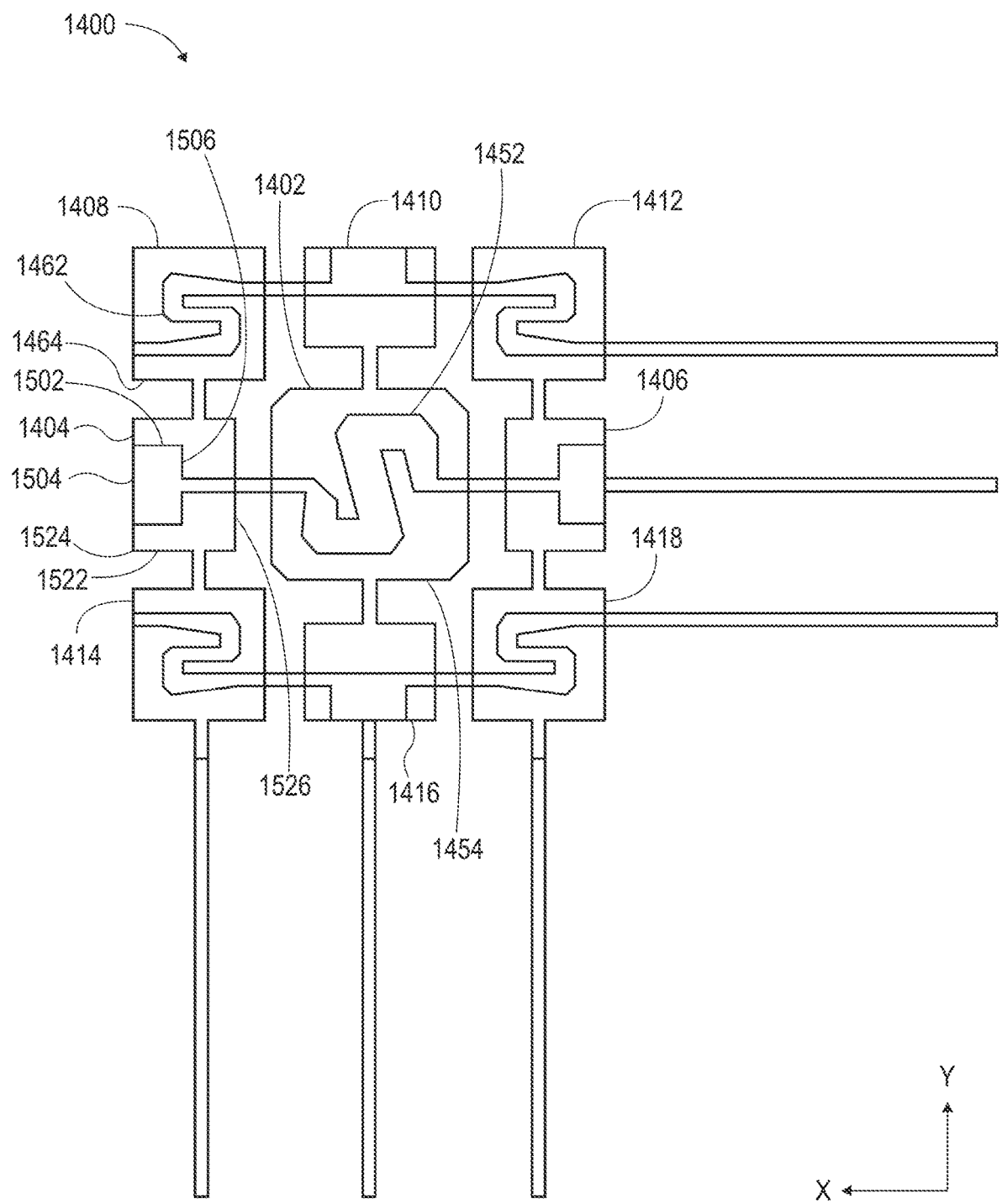
FIG. 14 is an illustrative overview of a proximity and three-axis force sensor, according to an exemplary embodiment of the present disclosure.

FIG. 14 is an illustrative overview 1400 of a proximity and three-axis force sensor, according to an exemplary embodiment of the present disclosure. In FIG. 14, the illustrative overview 1400 (e.g., from a top-down view or bird's-eye-view) includes an electrode architecture for a three by three (3×3) array of taxels 1402, 1404, 1406, 1408, 1410, 1412, 1414, 1416, 1418. According to one aspect, the 3×3 arrangement or configuration depicted in FIG. 14 may be referred to as a 'unit'. The proximity and three-axis force sensor of FIG. 14 includes two different types of taxels (e.g., a first taxel type and a second taxel type).

Proximity and Three-Axis Force Sensor Overview

The first taxel type may be a taxel capable of proximity sensing and detection of normal pressure (e.g., pressure applied in a normal direction). The first taxel type may be referred to herein as proximity and pressure (PP) taxels. The PP taxels may have an electrode architecture that has a combination of overlap area and exposed surface area, thereby enabling the taxel to function as both a projected capacitive sensor and an overlap capacitance sensor. Examples of the first taxel type include taxels 1402, 1408, 1412, 1414, 1418 of FIG. 14.

The second taxel type may be a taxel capable of horizontal force detection (e.g., lateral or longitudinal force detection along the x-axis and y-axis of FIG. 14) and detection of normal pressure or normal force (e.g., along the z-axis of FIGS. 15 and 16A-16D) and is described in greater detail with reference to FIGS. 15 and 16A-16D. The second taxel type may be referred to herein as horizontal and normal pressure (HN) taxels. The HN taxels may have an exposed electrode area which is capable of operating as a projected capacitance sensor. Since moving the top electrode horizontally (e.g., outward) and a proximity of a finger may both result in a decrease in capacitance, a ground shield (not shown in FIG. 14, but shown in FIGS. 15 and 16A-16D) may be implemented to cover only the HN taxels. In this way, the HN taxels may not respond to the proximity of the finger and merely respond to a horizontal force (e.g., along the x-axis and the y-axis of FIG. 14) and a normal force (e.g., along the z-axis of FIGS. 15 and 16A-16D). Examples of the second taxel type include taxels 1404, 1406, 1410, 1416 of FIG. 14.

Thus, each HN taxel may provide information regarding the force applied along a single horizontal axis and the normal pressure applied and act as a shear force sensor as well as a pressure sensor, but not as a proximity sensor due to the decoupling of the projected electric fields by the ground electrodes, which act as ground shields. In other words, taxels 1404 and 1406 may detect horizontal force along the x-axis while taxels 1410 and 1416 may detect horizontal force along the y-axis of FIG. 14.

Proximity and Pressure (PP) Taxels

According to one aspect, the proximity and three-axis force sensor based sensor may include a first taxel of the first taxel type, such as taxel 1402 of FIG. 14. The first taxel may include a first electrode 1452 formed within a top layer and may be configured in a serpentine pattern, a second electrode 1454 formed within a bottom layer, and a dielectric layer positioned between the top layer and the bottom layer. The first electrode 1452 of the first taxel may be similar to the serpentine top electrode 812 of FIG. 8. However, as seen in FIG. 14, the serpentine pattern of the first electrode 1452 of the first taxel may merely include a single "S" shape and/or one or two contours. The top layer may be similar to the top layer 822 of FIG. 9. The second electrode 1454 of the first taxel may be similar to the bottom electrode 814 of FIG. 8, which is associated with the bottom layer of FIG. 8. The second electrode 1454 of the first taxel may be a single exposed bottom electrode, rather than the configuration shown in FIG. 8 with multiple exposed bottom electrodes 814. The dielectric layer may be similar to the dielectric layer 202 from FIG. 8.

According to one aspect, multiple taxels (1402, 1408, 1412, 1414, 1418) of the first taxel type may be provided. It is not necessary for all of the taxels of the first taxel type to be identical. In fact, it may be beneficial or advantageous for different taxels of the first taxel type (i.e., PP taxels) to have variations among the different taxels. For example, a first taxel (e.g., 1402) of the first taxel type or PP taxel may have a first electrode 1452 configured in the serpentine pattern, a second taxel (e.g. 1408) of the first taxel type or PP taxel may have a first electrode 1462 configured in the serpentine pattern, a second electrode 1464 below the first electrode 1462, a third taxel (e.g., 1412) of the first taxel type or PP taxel may have a first electrode configured in the serpentine pattern, etc. However, according to one aspect, the serpentine pattern of the first electrode of the first taxel 1402, the serpentine pattern of the first electrode of the second taxel 1408, and the serpentine pattern of the first electrode of the third taxel 1412 may each have a different surface area or size.

The benefit or advantage of having different taxels of the same taxel type be of a different size or different surface area enables different proximity sensing ranges to be measured using the same cluster or array of taxels. As discussed above, as a result of electrode placement, a coupling electric field (e.g., 910) projects out of a plane from an excitation electrode (e.g., 822) and returns back to a sense electrode (e.g., 832). As a human finger (e.g., 912) approaches the sensor, the electric field 910 couples with the finger 912 and the coupling between the capacitive electrodes, Cs, decreases. The magnitude of the capacitance decrease increases as the finger comes closer to the sensor surface. Thus, both excitation and sense electrodes are exposed to enable the electric field to project outward and couple with a finger. When different size serpentine patterns are implemented, varying proximity range information may be received from respective taxels.

For example, with reference to the first taxel 1402 of the first taxel type or the PP taxel type and the second taxel 1408 of the first taxel type or the PP taxel type, it may be seen from FIG. 14 that the first electrode of the first taxel 1402 is configured in a serpentine pattern having a greater size or surface area than the serpentine pattern of the first electrode of the second taxel 1408 of the first taxel type or the PP taxel type. The smaller size or surface area of the serpentine pattern of the first electrode of the second taxel 1408 results or provides a smaller detection range for proximity sensing than the first taxel 1402 while the larger size or surface area of the serpentine pattern of the first electrode of the first taxel 1402 results or provides a larger detection range for proximity sensing than the second taxel 1408. Typically, the smaller the surface area or size of the serpentine pattern, the smaller the proximity detection range and higher spatial resolution provided by that corresponding taxel. Conversely, the larger the surface area or size of the serpentine pattern, the larger the proximity detection range and lower spatial resolution provided by that corresponding taxel. In this way, an array or cluster of taxels may be tuned to have at least two different taxels of the same taxel type but having different dimensions, sizes, surface areas, etc.

According to another aspect, the serpentine pattern of the first electrode of the first taxel 1402, the serpentine pattern of the first electrode of the second taxel 1408, the serpentine pattern of the first electrode of the third taxel 1412, and other corresponding taxels 1414, 1418 may have an identical surface area or size.

According to one aspect, any number of taxels of the first taxel type (PP taxels) may be combined with any number of taxels of the second taxel type (HN taxels or shear force detection taxels). Thus, a third, fourth, fifth, sixth, etc. taxel, each of one of the first taxel type (including the above discussed variations in size or surface area) or the second taxel type, may be added to the proximity and three-axis force sensor. For example, a third taxel could potentially be either of the first taxel type or the second taxel type.

As discussed above, the third taxel may be a PP taxel and may include a first electrode formed within the top layer and configured in a serpentine pattern having a different size or surface area than other serpentine patterns of other corresponding electrodes and a second electrode formed within the bottom layer.

Horizontal and Normal Pressure (HN) or Shear Force Taxels

Figure 15:
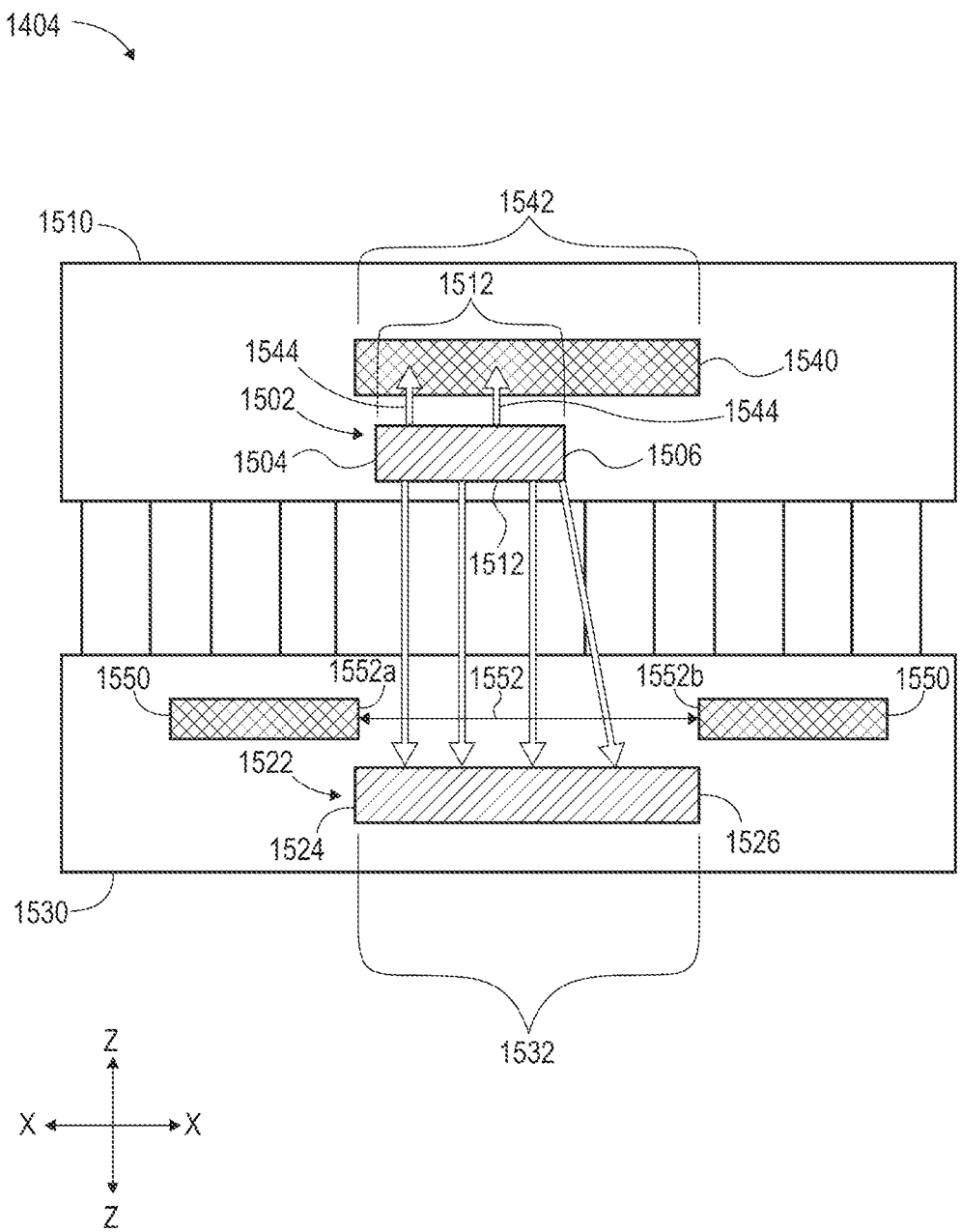
FIG. 15 is a cross-sectional view of a proximity and three-axis force sensor, according to an exemplary embodiment of the present disclosure.

FIG. 15 is a cross-sectional view of an HN taxel of a proximity and three-axis force sensor, according to an exemplary embodiment of the present disclosure. According to one aspect, the cross-sectional view of an HN taxel of a proximity and three-axis force sensor of FIG. 15 is of the HN taxel 1404 from FIG. 14.

According to one aspect, the proximity and three-axis force sensor based sensor may include a second taxel of the second taxel type (e.g., HN taxel). The second taxel may include a first electrode 1502 formed within the top layer 1510 and having a first surface area 1512, a second electrode 1522 formed within the bottom layer 1530 and having a second surface area 1532, and a ground electrode 1540 formed within the top layer 1510 above the first electrode 1502 of the second taxel and having a surface area 1542 greater than the first surface area 1512 of the first electrode 1502 of the second taxel and decoupling electric fields 1544 emitted by the first electrode 1502 of the second taxel. This difference in surface area of the first electrode 1502 formed within the top layer 1510 having the first surface area 1512 and the second electrode 1522 formed within the bottom layer 1530 having the second surface area 1532 enables changes in overlap capacitance to be measured, as will be described in greater detail herein.

The second surface area 1532 of the second electrode 1522 of the second taxel may be different than the first surface area 1512 of the first electrode 1502 of the second taxel. For example, the second surface area 1532 of the second electrode 1522 of the second taxel may be greater than the first surface area 1512 of the first electrode 1502 of the second taxel. Thus, any change in overlap area in the vertical or z-axis direction results in a change in the overlap capacitance for this corresponding taxel. Explained yet another way, a first edge 1504 of the first electrode 1502 of the second taxel may be vertically aligned with a first edge 1524 of the second electrode 1522 of the second taxel. Additionally, a second edge 1506 of the first electrode 1502 of the second taxel may not be vertically aligned with a second edge 1526 of the second electrode 1522 of the second taxel.

Although the embodiments and aspects herein are described with respect to the second surface area 1532 of the second electrode 1522 of the second taxel being greater than the first surface area 1512 of the first electrode 1502 of the second taxel, other embodiments are possible where the reverse is implemented (i.e., the second surface area of the second electrode of the second taxel being less than the first surface area of the first electrode of the second taxel).

In this way, an overlap area between the first electrode 1502 of the second taxel and the second electrode 1522 of the second taxel may decrease and a capacitance of the second taxel of the proximity and three-axis force sensor may decrease when a lateral force is applied to the top layer in a lateral direction (e.g., to the left, along the x-axis in FIG. 15). Conversely, an overlap area between the first electrode of the second taxel and the second electrode of the second taxel may remain constant and a capacitance of the second taxel of the proximity and three-axis force sensor may remain constant when a lateral force is applied to the top layer in an opposite lateral direction (e.g., to the right, along the x-axis in FIG. 15).

The benefit or advantage of having the second surface area 1532 of the second electrode 1522 of the second taxel be different than the first surface area 1512 of the first electrode 1502 of the second taxel is that horizontal forces or lateral forces applied to the top layer 1510 in a lateral direction may cause an overlap area between the first electrode 1502 of the second taxel and the second electrode 1522 of the second taxel to decrease and cause a capacitance of the second taxel of the proximity and three-axis force sensor to decrease, thereby enabling the sensor to differentiate between normal forces and lateral forces along the lateral direction and sense both horizontal (e.g., along a lateral axis, such as the x-axis or y-axis) and normal forces (e.g., along the z-axis). Additionally, a dielectric thickness of the dielectric layer may decrease and a capacitance of the second taxel of the proximity and three-axis force sensor may increase when a normal force is applied to the top layer in a vertical direction.

Ground Shield (Top Electrode)

As discussed above and with reference to FIGS. 15 and 16A-16D, a ground shield or ground electrode 1540 may be implemented to cover the top electrode 1502 of the HN taxels. In other words, the ground electrode 1540 may be formed within the top layer 1510 above the first electrode 1502 of the second taxel and may have a surface area 1542 greater than the first surface area 1512 of the first electrode 1502 of the second taxel and decoupling electric fields 1544 emitted by the first electrode 1502 of the second taxel. Specifically, the ground electrode 1540 may decouple any projected electric fields 1544 from emitting from the top electrode of the HN taxels, thereby mitigating exposed electrode area, and thus, capacitance change to merely in reaction or response to a normal force or a horizontal shear force. In this way, the ground electrode 1540 formed within the top layer may mitigate proximity detection for the HN taxels.

Ground Shield (Bottom Electrode)

With reference to FIGS. 15 and 16A-16D, the second taxel may include a ground electrode 1550 formed within the bottom layer 1530 above the second electrode 1522. The ground electrode 1550 of the bottom layer 1530 may not overlap the second electrode 1522 in the vertical direction (e.g., along the z-axis). Explained another way, the ground electrode 1550 of the bottom layer 1530 may include a void 1552 defined directly above the second electrode 1522 in the vertical direction. Stated yet another way, the ground electrode 1550 of the bottom layer 1530 may define the void 1552 vertically aligned with second electrode 1522 in a vertical or height direction of the semiconductor or sensor, where the void 1552 is sized such that the ground electrode 1550 does not overlay the second electrode 1522 in the height direction or vertical direction, along the z-axis. Stated yet again, in FIGS. 15 and 16A-16D, the ground electrode 1550 includes a first inner surface 1552a and a second inner surface 1552b that defines the void 1552, the inner surfaces 1552a, 1552b offset or spaced outwardly from outer periphery edges 1524, 1524 of the second electrode, thereby enhancing the decrease in capacitance when any change in overlap area occurs between the top electrode 1502 and the bottom electrode 1522.

The second taxel may include a ground electrode 1550 formed within the bottom layer 1530 above the second electrode 1522. The ground electrode 1550 of the bottom layer 1530 may not overlap the second electrode 1522 in the vertical direction. Explained another way, the ground electrode 1550 of the bottom layer may include a void 1552 defined directly above the second electrode 1522 in the vertical direction.

Thus, the ground electrode 1550 formed in the bottom layer 1530 may enhance the decrease in capacitance when a horizontal force is applied to the HN taxel by mitigating electric fields from emitting from the electrodes and increasing the overlap area that the top electrode has with the ground plane of the bottom layer, thereby resulting in a further decrease or enhanced decrease in capacitance when the horizontal force is applied. In this way, a benefit or advantage of the ground plane of the bottom layer may be to increase or enhance the sensitivity of the HN taxel.

FIGS. 16A-16D are cross-sectional views of an HN taxel of a proximity and three-axis force sensor across various operation conditions, according to an exemplary embodiment of the present disclosure.

FIG. 16A is a cross-sectional view of the HN taxel of the proximity and three-axis force sensor when no force is applied, according to an exemplary embodiment of the present disclosure. As seen in FIG. 16A, the top, first electrode 1502 fully overlaps with the bottom second electrode 1522 in the vertical direction and the dielectric thickness 1610 is at a baseline thickness or distance in a first state associated with a baseline capacitance reading for the illustrated taxel.

FIG. 16B is a cross-sectional view of the HN taxel of the proximity and three-axis force sensor when merely a normal force is applied, according to an exemplary embodiment of the present disclosure. As previously discussed, the dielectric thickness of the dielectric layer may decrease and the capacitance of the taxel of the proximity and three-axis force sensor may increase when the normal force is applied to the top layer in the vertical direction. In this regard, the top, first electrode 1502 fully overlaps with the bottom second electrode 1522 in the vertical direction and the dielectric thickness 1612 is at thickness less than the baseline thickness or distance due to the normal force applied in FIG. 16B. Therefore, the taxel is in a second state associated with a capacitance greater than the baseline capacitance reading in FIG. 16A. This capacitance reading may be received by a processor, which may determine that normal pressure is being applied to the taxel based on a magnitude of the capacitance and based on the capacitance being greater than the baseline capacitance.

FIG. 16C is a cross-sectional view of the HN taxel of the proximity and three-axis force sensor when merely horizontal force is applied, according to an exemplary embodiment of the present disclosure. In other words, if this horizontal force is applied, and the top electrode 1502 is shifted horizontally to the left, the overlap area decreases (e.g., compared to the overlap area of FIG. 16A), resulting in a decrease in capacitance for the taxel of FIG. 16C. In this regard, the top, first electrode 1502 merely partially overlaps 1614 the bottom second electrode 1522 in the vertical direction due to the horizontal force applied in FIG. 16C while the dielectric thickness 1612 is equal to the baseline thickness or distance. Therefore, the taxel is in a third state associated with a capacitance less than the baseline capacitance reading in FIG. 16A. This capacitance reading may be received by the processor, which may determine that a horizontal force is being applied to the taxel based on a magnitude of the capacitance and based on the capacitance being less than the baseline capacitance.

FIG. 16D is a cross-sectional view of the HN taxel of the proximity and three-axis force sensor when both normal and horizontal forces are applied, according to an exemplary embodiment of the present disclosure. Here, the dielectric thickness 1612 is at thickness less than the baseline thickness or distance due to the normal force being applied. Further, the top, first electrode 1502 merely partially overlaps 1614 the bottom second electrode 1522 in the vertical direction due to the horizontal force being applied. Therefore, the taxel is in a fourth state associated with an ambiguous capacitance which may be greater than or less than the baseline capacitance reading in FIG. 16A. Capacitance reading of neighboring taxels from the same unit may be received by the processor to facilitate determination of forces being applied. For example, when taxel 1406 of FIG. 14, registers no change in capacitance reading, the processor may determine that either no horizontal force is applied or that some horizontal force is applied. If taxel 1402 detects pressure and/or proximity sensing via an increased capacitance, taxel 1406 detects no change in capacitance, and taxel 1404 detects some change in capacitance, the processor may determine that the horizontal and normal force are simultaneously applied based on the data from neighboring taxels 1402 and 1406. Further, taxels corresponding to taxel 1404 from neighboring units may register the horizontal force, and the processor may determine the simultaneous horizontal and normal force based thereon via a detection analyzer 1830, as will be described in FIG. 18.

In one scenario, the third taxel may be an HN taxel and may include a first electrode formed within the top layer and having a first surface area, a second electrode formed within the bottom layer and having a second surface area, and a ground electrode formed within the top layer above the first electrode of the third taxel and having a surface area greater than the first surface area of the first electrode of the third taxel. In another scenario, the third taxel may be an HN taxel and may include a first electrode formed within the top layer and having a first surface area, a second electrode formed within the bottom layer and having a second surface area, and a ground electrode formed within the bottom layer above the first electrode of the third taxel, the ground electrode of the third taxel may not overlap the second electrode of the third taxel in a vertical direction.

In yet another scenario, the third taxel may be an HN taxel and may include a first electrode formed within the top layer and having a first surface area, a second electrode formed within the bottom layer and having a second surface area, a first ground electrode formed within the top layer above the first electrode of the third taxel and having a surface area greater than the first surface area of the first electrode of the third taxel, and a second ground electrode formed within the bottom layer above the first electrode of the third taxel. The second ground electrode of the third taxel may not overlap the second electrode of the third taxel in a vertical direction.

The second surface area of the second electrode of the third taxel may be different than the first surface area of the first electrode of the third taxel. A first edge of the first electrode of the third taxel may not be vertically aligned with a first edge of the second electrode of the third taxel. A second edge of the first electrode of the third taxel may be vertically aligned with a second edge of the second electrode of the third taxel. The first edge of the first electrode of the second taxel may be opposed to the second edge of the first electrode of the third taxel. The first edge of the second electrode of the second taxel may be opposed to the second edge of the second electrode of the third taxel.

An overlap area between the first electrode of third taxel and the second electrode of the third taxel may remain constant and a capacitance of the third taxel of the proximity and three-axis force sensor may remain constant when the lateral force is applied to the top layer in the lateral direction. An overlap area between the first electrode of third taxel and the second electrode of the third taxel may decrease and a capacitance of the third taxel of the proximity and three-axis force sensor may decrease when the lateral force is applied to the top layer in the opposite lateral direction.

Operation of Proximity and Three-Axis Force Sensor

Therefore, the proximity and three-axis force sensor of FIG. 14 is capable of distinguishing between normal force and horizontal forces along two axes (e.g., the x-axis and the y-axis). When a pressure (i.e., normal force along a z-axis) is applied to any of the taxels of FIG. 14, this results in an increase in capacitance due to the decreased dielectric thickness for impacted or pressured taxels.

When a horizontal force is applied to the left (e.g., along the x-axis), for example, the left-most HN taxel registers a decrease in capacitance due to the change or decrease in surface area between the first electrode and the second electrode. It should be noted however, that this same horizontal force being applied to the left results in no change of capacitance for the right-most HN taxel because the first electrode merely shifts slightly left and remains over the second electrode.

When a horizontal force is applied to the right (e.g., along the x-axis), for example, the right-most HN taxel registers a decrease in capacitance due to the change or decrease in surface area between the first electrode and the second electrode. It should be noted however, that this same horizontal force being applied to the right results in no change of capacitance for the left-most HN taxel because the first electrode merely shifts slightly left and remains over the second electrode.

When a horizontal force is applied upwards (e.g., along the y-axis), for example, the upper-most HN taxel registers a decrease in capacitance due to the change or decrease in surface area between the first electrode and the second electrode. It should be noted however, that this same horizontal force being applied upwards results in no change of capacitance for the lower-most HN taxel because the first electrode merely shifts slightly left and remains over the second electrode.

When a horizontal force is applied downwards (e.g., along the y-axis), for example, the lower-most HN taxel registers a decrease in capacitance due to the change or decrease in surface area between the first electrode and the second electrode. It should be noted however, that this same horizontal force being applied downwards results in no change of capacitance for the upper-most HN taxel because the first electrode merely shifts slightly left and remains over the second electrode.

Due to the change in capacitance being a decrease for horizontal force and an increase for normal force, neighboring taxels or taxels from the same unit may be utilized to determine an overall force being applied to the unit. For example, with respect to the left-most HN taxel of FIG. 14, a normal pressure provides an increase in capacitance and horizontal force to the left provides a decrease in capacitance. If other taxels register an increase in capacitance, a processor may determine that both normal and a leftward force are detected. In this way, an array of taxels of units of taxels may be implemented, thereby enabling a processor to determine complete three-axis force measurement, along with proximity measurements via the serpentine based taxels.

Figure 17:
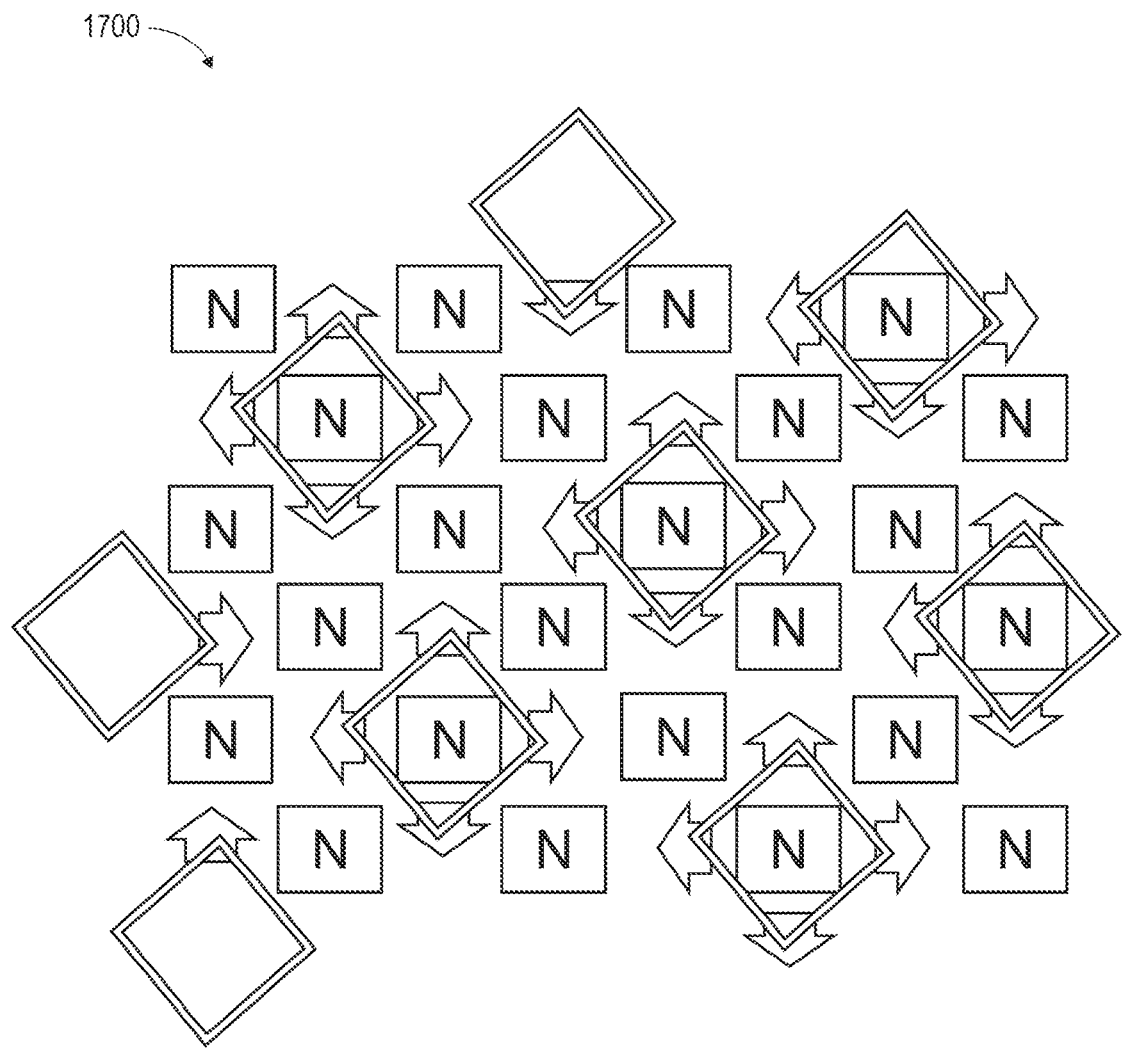
FIG. 17 is an illustrative overview of an array of taxels for a proximity and three-axis force sensor, according to an exemplary embodiment of the present disclosure.

FIG. 17 is an illustrative overview of an array 1700 of taxels for a proximity and three-axis force sensor, according to an exemplary embodiment of the present disclosure. In order to obtain a more complete description of forces being applied in a given scenario, an interaction may result in multiple taxels being interacted with or manipulated, which provides information regarding multi-axis forces and proximity, for example. According to one aspect, each "N" depicted may represent a unit of taxels, such as the unit of FIG. 14, although other embodiments may be implemented (e.g., 4×4, 4×5, 5×5, etc.).

Figure 18:
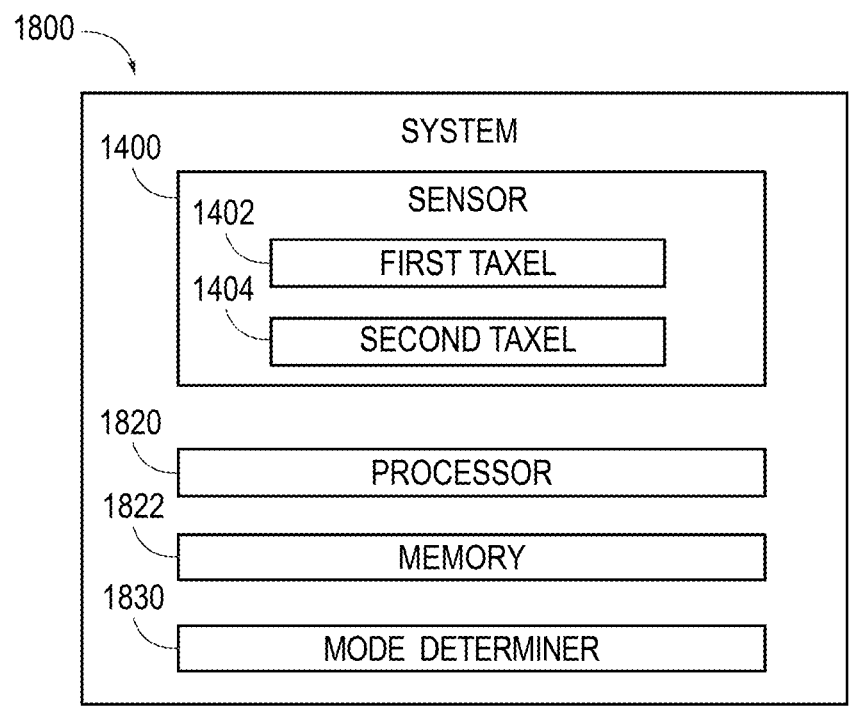
FIG. 18 is a component diagram of an exemplary system for proximity and three-axis force based sensing, according to an exemplary embodiment of the present disclosure.

FIG. 18 is a component diagram of an exemplary system 1800 for proximity and three-axis force based sensing, according to an exemplary embodiment of the present disclosure. According to one aspect, the processor 1820 and memory 1822 of FIG. 18 may determine one or more of a proximity, a first horizontal force, a second horizontal force, and a normal force applied to the system 1800 for proximity and three-axis force based sensing based on input or data from taxels of the first taxel type and taxels of the second taxel type which are neighboring one another via a detection analyzer 1830, which may be implemented via the processor 1820 and memory 1822.

Figure 19:
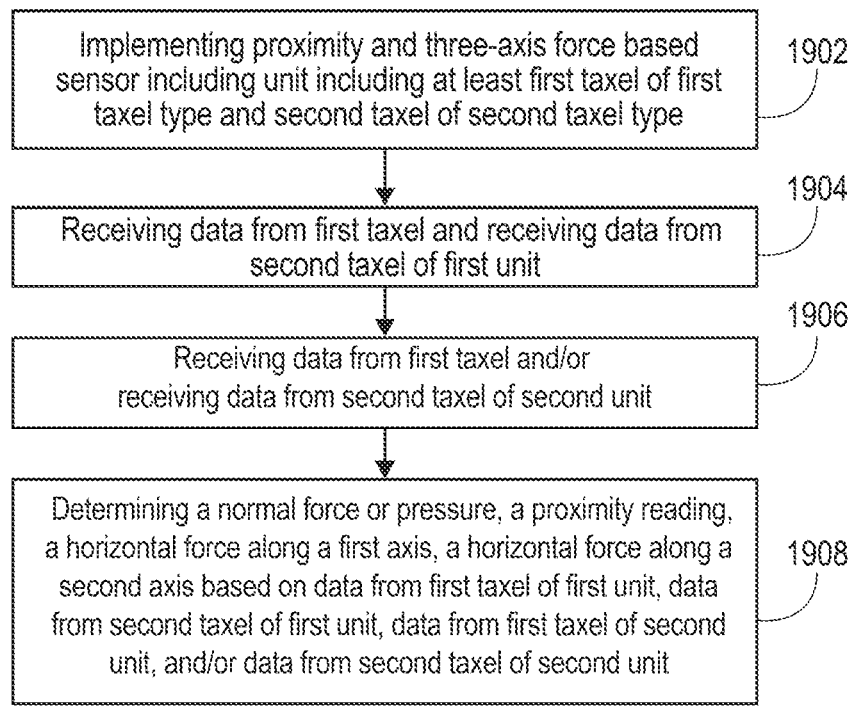
FIG. 19 is a flow diagram of an exemplary method for proximity and three-axis force based sensing, according to an exemplary embodiment of the present disclosure.

FIG. 19 is a flow diagram of an exemplary method 1900 for proximity and three-axis force based sensing, according to an exemplary embodiment of the present disclosure. The method 1900 for proximity and three-axis force based sensing may include implementing 1902 a proximity and three-axis force based sensor including a unit including at least a first taxel of a first taxel type and a second taxel of a second taxel type, receiving 1904 data from the first taxel and receiving data from the second taxel of the first unit, receiving 1906 data from a first taxel and/or receiving data from a second taxel of a second unit, and determining 1908 at least one of a normal force or a pressure, a proximity reading, a horizontal force along a first axis, a horizontal force along a second axis based on the data from the first taxel of the first unit, data from the second taxel of the first unit, data from the first taxel of the second unit, and/or data from the second taxel of the second unit.

Figure 20:
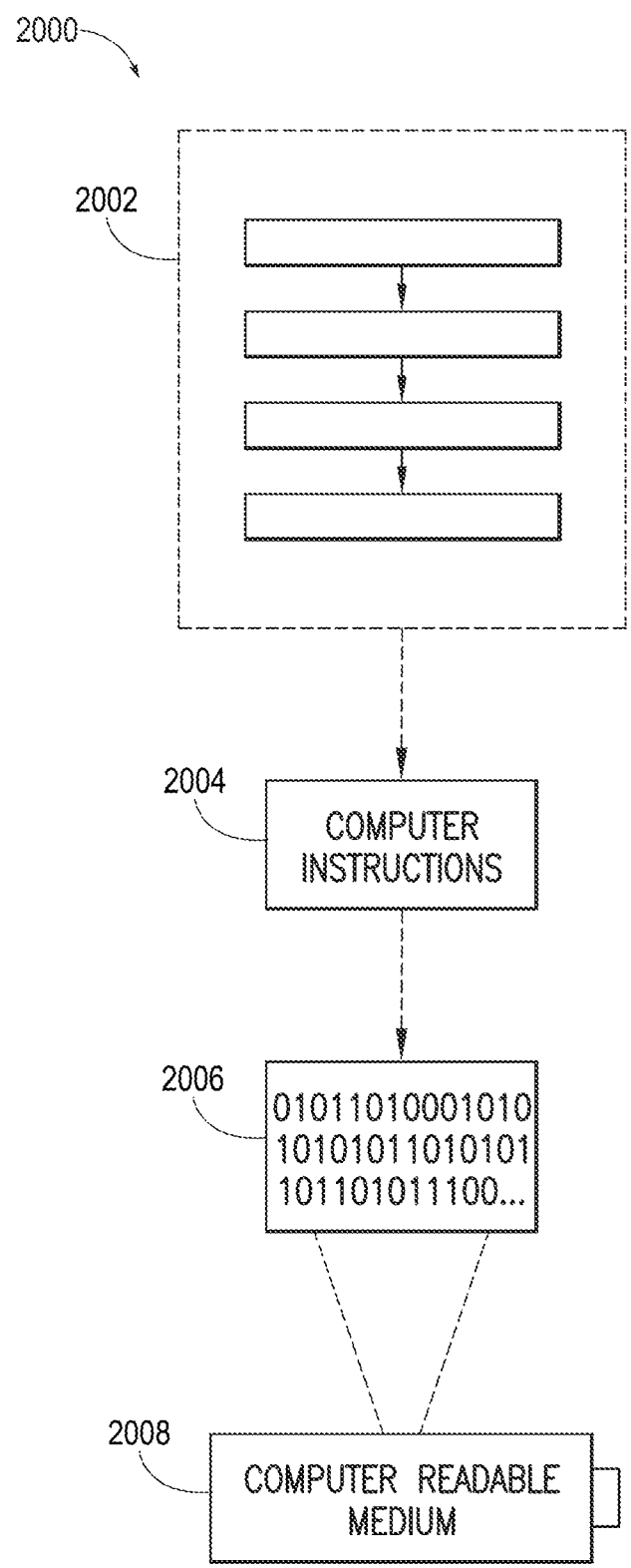
FIG. 20 is an illustration of an example computer-readable medium or computer-readable device including processor-executable instructions configured to embody one or more of the provisions set forth herein, according to an exemplary embodiment of the present disclosure.

Still another aspect involves a computer-readable medium including processor-executable instructions configured to implement one aspect of the techniques presented herein. An aspect of a computer-readable medium or a computer-readable device devised in these ways is illustrated in FIG. 20, wherein an implementation 2000 includes a computer-readable medium 2008, such as a CD-R, DVD-R, flash drive, a platter of a hard disk drive, etc., on which is encoded computer-readable data 2006. This encoded computer-readable data 2006, such as binary data including a plurality of zero's and one's as shown in 2006, in turn includes a set of processor-executable computer instructions 2004 configured to operate according to one or more of the principles set forth herein. In this implementation 2000, the processor-executable computer instructions 2004 may be configured to perform a method 2002, such as the method 1300 of FIG. 13 or the method 1900 of FIG. 19. In another aspect, the processor-executable computer instructions 2004 may be configured to implement a system, such as the system 1200 of FIG. 12 or the system 1800 of FIG. 18. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 21:
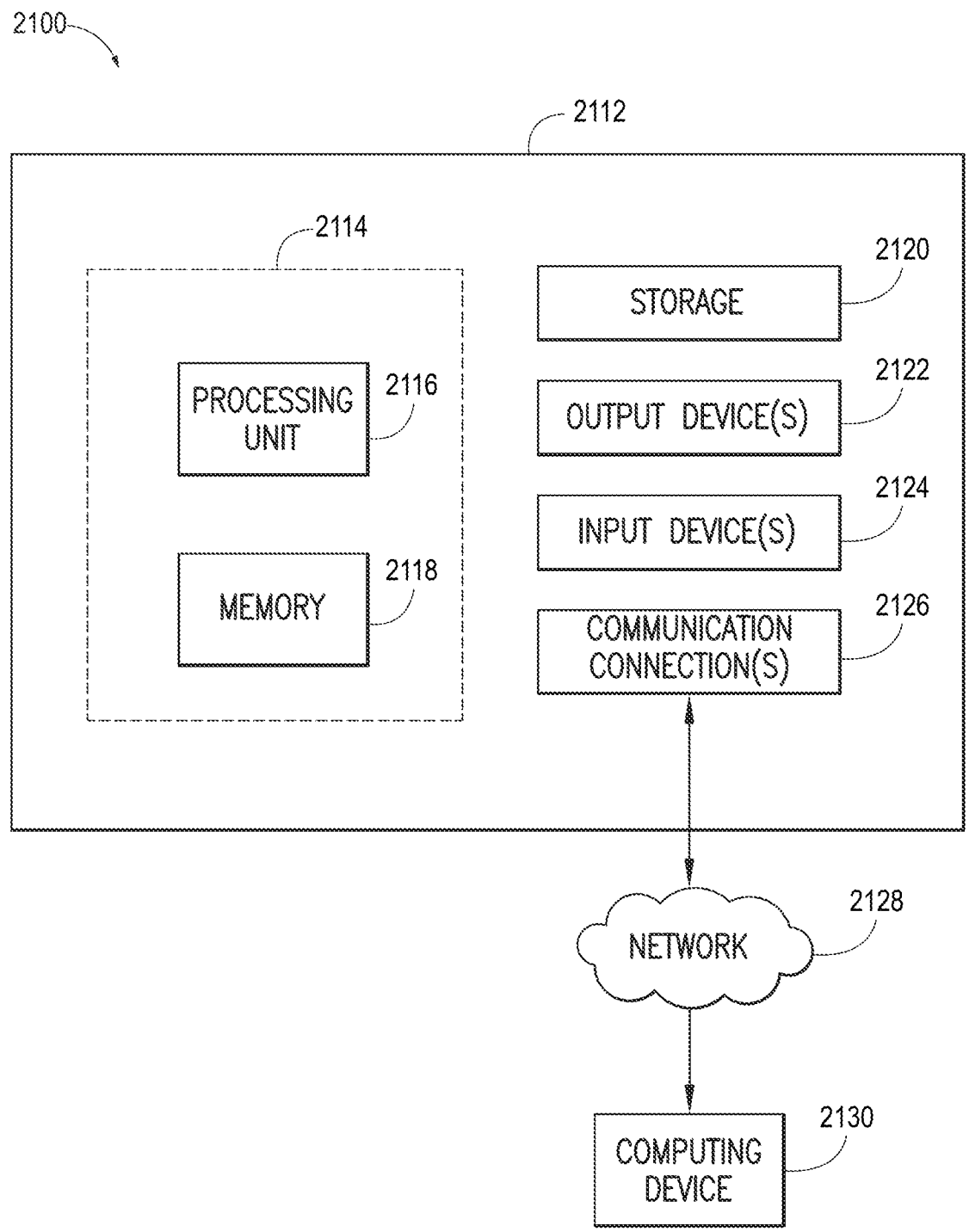
FIG. 21 is an illustration of an example computing environment where one or more of the provisions set forth herein are implemented, according to an exemplary embodiment of the present disclosure.

FIG. 21 and the following discussion provide a description of a suitable computing environment to implement aspects of one or more of the provisions set forth herein. The operating environment of FIG. 21 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions may be combined or distributed as desired in various environments.

FIG. 21 illustrates a system 2100 including a computing device 2112 configured to implement one aspect provided herein. In one configuration, the computing device 2112 includes at least one processing unit 2116 and memory 2118. Depending on the exact configuration and type of computing device, memory 2118 may be volatile, such as RAM, non-volatile, such as ROM, flash memory, etc., or a combination of the two. This configuration is illustrated in FIG. 21 by dashed line 2114.

In other aspects, the computing device 2112 includes additional features or functionality. For example, the computing device 2112 may include additional storage such as removable storage or non-removable storage, including, but not limited to, magnetic storage, optical storage, etc. Such additional storage is illustrated in FIG. 21 by storage 2120. In one aspect, computer readable instructions to implement one aspect provided herein are in storage 2120. Storage 2120 may store other computer readable instructions to implement an operating system, an application program, etc. Computer readable instructions may be loaded in memory 2118 for execution by processing unit 2116, for example.

The term "computer readable media" as used herein includes computer storage media. Computer storage media includes volatile and nonvolatile, removable and non-removable media implemented in any method or technology for storage of information such as computer readable instructions or other data. Memory 2118 and storage 2120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 2112. Any such computer storage media is part of the computing device 2112.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 2112 includes input device(s) 2124 such as keyboard, mouse, pen, voice input device, touch input device, infrared cameras, video input devices, or any other input device. Output device(s) 2122 such as one or more displays, speakers, printers, or any other output device may be included with the computing device 2112. Input device(s) 2124 and output device(s) 2122 may be connected to the computing device 2112 via a wired connection, wireless connection, or any combination thereof. In one aspect, an input device or an output device from another computing device may be used as input device(s) 2124 or output device(s) 2122 for the computing device 2112. The computing device 2112 may include communication connection(s) 2126 to facilitate communications with one or more other devices 2130, such as through network 2128, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A proximity and three-axis force sensor based sensor, comprising:
    a first taxel including:
        a first electrode formed within a top layer and configured in a serpentine pattern;
        a second electrode formed within a bottom layer; and
        a dielectric layer positioned between the top layer and the bottom layer; and
    a second taxel including:
        a first electrode formed within the top layer and having a first surface area;
        a second electrode formed within the bottom layer and having a second surface area; and
        a ground electrode formed within the top layer above the first electrode of the second taxel and having a surface area greater than the first surface area of the first electrode of the second taxel and decoupling electric fields emitted by the first electrode of the second taxel, wherein the second surface area of the second electrode of the second taxel is different than the first surface area of the first electrode of the second taxel, wherein a first edge of the first electrode of the second taxel is vertically aligned with a first edge of the second electrode of the second taxel.

2. The proximity and three-axis force sensor based sensor of claim 1, wherein the second taxel includes a ground electrode formed within the bottom layer above the second electrode, wherein the ground electrode of the bottom layer does not overlap the second electrode in a vertical direction.

3. The proximity and three-axis force sensor based sensor of claim 1, wherein the second taxel includes a ground electrode formed within the bottom layer above the second electrode, wherein the ground electrode of the bottom layer includes a void defined directly above the second electrode in a vertical direction.

4. The proximity and three-axis force sensor based sensor of claim 1, wherein a second edge of the first electrode of the second taxel is not vertically aligned with a second edge of the second electrode of the second taxel.

5. The proximity and three-axis force sensor based sensor of claim 1, wherein a dielectric thickness of the dielectric layer decreases and a capacitance of the second taxel of the proximity and three-axis force sensor increases when a normal force is applied to the top layer in a vertical direction.

6. The proximity and three-axis force sensor based sensor of claim 1, wherein an overlap area between the first electrode of the second taxel and the second electrode of the second taxel decreases and a capacitance of the second taxel of the proximity and three-axis force sensor decreases when a lateral force is applied to the top layer in a lateral direction.

7. The proximity and three-axis force sensor based sensor of claim 1, comprising:
   a third taxel including:
      a first electrode formed within the top layer and having a first surface area;
      a second electrode formed within the bottom layer and having a second surface area; and
      a ground electrode formed within the top layer above the first electrode of the third taxel and having a surface area greater than the first surface area of the first electrode of the third taxel,
   wherein the second surface area of the second electrode of the third taxel is different than the first surface area of the first electrode of the third taxel,
   wherein a first edge of the first electrode of the third taxel is not vertically aligned with a first edge of the second electrode of the third taxel,
   wherein a second edge of the first electrode of the third taxel is vertically aligned with a second edge of the second electrode of the third taxel,
   wherein the first edge of the first electrode of the second taxel is opposed to the second edge of the first electrode of the third taxel, and
   wherein the first edge of the second electrode of the second taxel is opposed to the second edge of the second electrode of the third taxel.

8. The proximity and three-axis force sensor based sensor of claim 1, wherein an overlap area between the first electrode of the second taxel and the second electrode of the second taxel decreases and a capacitance of the second taxel of the proximity and three-axis force sensor decreases when a lateral force is applied to the top layer in a lateral direction, and
   wherein an overlap area between the first electrode of third taxel and the second electrode of the third taxel remains constant and a capacitance of the third taxel of the proximity and three-axis force sensor remains constant when the lateral force is applied to the top layer in the lateral direction.

9. The proximity and three-axis force sensor based sensor of claim 8, wherein an overlap area between the first electrode of the second taxel and the second electrode of the second taxel remains constant and a capacitance of the second taxel of the proximity and three-axis force sensor remains constant when a lateral force is applied to the top layer in an opposite lateral direction, and
   wherein an overlap area between the first electrode of third taxel and the second electrode of the third taxel decreases and a capacitance of the third taxel of the proximity and three-axis force sensor decreases when the lateral force is applied to the top layer in the opposite lateral direction.

10. The proximity and three-axis force sensor based sensor of claim 1, wherein the second surface area of the second electrode of the second taxel is greater than the first surface area of the first electrode of the second taxel.

11. A proximity and three-axis force sensor based sensor, comprising:
   a first taxel including:
      a first electrode formed within a top layer and configured in a serpentine pattern;
      a second electrode formed within a bottom layer; and
      a dielectric layer positioned between the top layer and the bottom layer; and
   a second taxel including:
      a first electrode formed within the top layer and having a first surface area;
      a second electrode formed within the bottom layer and having a second surface area; and
      a ground electrode formed within the bottom layer above the second electrode, wherein the ground electrode does not overlap the second electrode in a vertical direction,
   wherein the second surface area of the second electrode of the second taxel is different than the first surface area of the first electrode of the second taxel, and
   wherein a first edge of the first electrode of the second taxel is vertically aligned with a first edge of the second electrode of the second taxel.

12. The proximity and three-axis force sensor based sensor of claim 11, wherein the second taxel includes a ground electrode formed within the top layer above the first electrode of the second taxel having a surface area greater than the first surface area of the first electrode of the second taxel.

13. The proximity and three-axis force sensor based sensor of claim 11, wherein the ground electrode of the bottom layer includes a void defined directly above the second electrode in the vertical direction.

14. The proximity and three-axis force sensor based sensor of claim 11, wherein a second edge of the first electrode of the second taxel is not vertically aligned with a second edge of the second electrode of the second taxel.

15. The proximity and three-axis force sensor based sensor of claim 11, wherein a dielectric thickness of the dielectric layer decreases and a capacitance of the second taxel of the proximity and three-axis force sensor increases when a normal force is applied to the top layer in the vertical direction.

16. The proximity and three-axis force sensor based sensor of claim 11, wherein an overlap area between the first electrode of the second taxel and the second electrode of the second taxel decreases and a capacitance of the second taxel of the proximity and three-axis force sensor decreases when a lateral force is applied to the top layer in a lateral direction.

17. The proximity and three-axis force sensor based sensor of claim 11, comprising:
a third taxel including:
a first electrode formed within the top layer and having a first surface area;
a second electrode formed within the bottom layer and having a second surface area; and
a ground electrode formed within the bottom layer above the first electrode of the third taxel, wherein the ground electrode of the third taxel does not overlap the second electrode of the third taxel in a vertical direction,
wherein the second surface area of the second electrode of the third taxel is different than the first surface area of the first electrode of the third taxel,
wherein a first edge of the first electrode of the third taxel is not vertically aligned with a first edge of the second electrode of the third taxel,
wherein a second edge of the first electrode of the third taxel is vertically aligned with a second edge of the second electrode of the third taxel,
wherein the first edge of the first electrode of the second taxel is opposed to the second edge of the first electrode of the third taxel, and
wherein the first edge of the second electrode of the second taxel is opposed to the second edge of the second electrode of the third taxel.

18. The proximity and three-axis force sensor based sensor of claim 11, wherein an overlap area between the first electrode of the second taxel and the second electrode of the second taxel decreases and a capacitance of the second taxel of the proximity and three-axis force sensor decreases when a lateral force is applied to the top layer in a lateral direction, and
wherein an overlap area between the first electrode of third taxel and the second electrode of the third taxel remains constant and a capacitance of the third taxel of the proximity and three-axis force sensor remains constant when the lateral force is applied to the top layer in the lateral direction.

19. The proximity and three-axis force sensor based sensor of claim 18, wherein an overlap area between the first electrode of the second taxel and the second electrode of the second taxel remains constant and a capacitance of the second taxel of the proximity and three-axis force sensor remains constant when a lateral force is applied to the top layer in an opposite lateral direction, and
wherein an overlap area between the first electrode of third taxel and the second electrode of the third taxel decreases and a capacitance of the third taxel of the proximity and three-axis force sensor decreases when the lateral force is applied to the top layer in the opposite lateral direction.

20. A proximity and three-axis force sensor based sensor, comprising:
a first taxel including:
a first electrode formed within a top layer and configured in a serpentine pattern;
a second electrode formed within a bottom layer; and
a dielectric layer positioned between the top layer and the bottom layer;
a second taxel including:
a first electrode formed within the top layer and having a first surface area;
a second electrode formed within the bottom layer and having a second surface area; and
a ground electrode formed within the top layer above the first electrode of the second taxel and having a surface area greater than the first surface area of the first electrode; and
a third taxel including:
a first electrode formed within the top layer and configured in a serpentine pattern; and
a second electrode formed within the bottom layer,
wherein the serpentine pattern of the first electrode of the first taxel and the serpentine pattern of the first electrode of the third taxel have different surface areas,
wherein the second surface area of the second electrode of the second taxel is different than the first surface area of the first electrode of the second taxel, and
wherein a first edge of the first electrode of the second taxel is vertically aligned with a first edge of the second electrode of the second taxel.

* * * * *